United States Patent [19]
Chiappe et al.

[11] Patent Number: 5,193,970
[45] Date of Patent: Mar. 16, 1993

[54] HIGH SPEED/HIGH CAPACITY AUTOMATED WORKLOAD REGULATOR

[75] Inventors: Wayne T. Chiappe, Hinsdale, Ill.; Randy W. Gasquoine, Stockton, Calif.

[73] Assignee: Sardee Industries Inc., Alsip, Ill.

[21] Appl. No.: 667,546

[22] Filed: Mar. 11, 1991

[51] Int. Cl.$^5$ .............................................. B65G 1/04
[52] U.S. Cl. ................................. 414/416; 414/798.9
[58] Field of Search ............ 414/331, 403, 416, 295.6, 414/798.9; 198/419.1

[56] References Cited

U.S. PATENT DOCUMENTS

| | | | |
|---|---|---|---|
| 3,826,348 | 7/1974 | Preisig et al. | 414/798.9 |
| 4,610,346 | 9/1986 | Phillipson | 198/419.1 |
| 4,808,057 | 2/1989 | Chiappe et al. | 414/416 X |
| 4,946,340 | 8/1990 | Murphy et al. | 414/416 X |
| 4,979,870 | 12/1990 | Mojden et al. | 414/416 X |

FOREIGN PATENT DOCUMENTS 476598  9/1969  Switzerland ..................... 198/419.1

*Primary Examiner*—David A. Bucci
*Attorney, Agent, or Firm*—Lockwood, Alex, Fitzgibbon & Cummings

[57] ABSTRACT

An improved automated workload balancing apparatus is described including an expanded coplanar transfer station having an inbound accumulating area, an outbound accumulating area and at least one outer storage placement and retrieval area linearly aligned along a longitudinally extending transfer axis. A pickup transfer head is reciprocatably translatable along the transfer axis to regulate overall flow of groups of articles through the balancer device. In accordance with the preferred embodiment, preformed groups are moved uphill or downhill into and out of the inbound and outbound accumulating areas, respectively for improved article management. Front and rear holding devices are included to further provide enhanced article management. In an especially preferred embodiment, angled infeed and angled outfeed track segments are rotatable into and out of position in the transfer station to position the groups for pickup and transfer before sending them on for further processing steps.

2 Claims, 20 Drawing Sheets

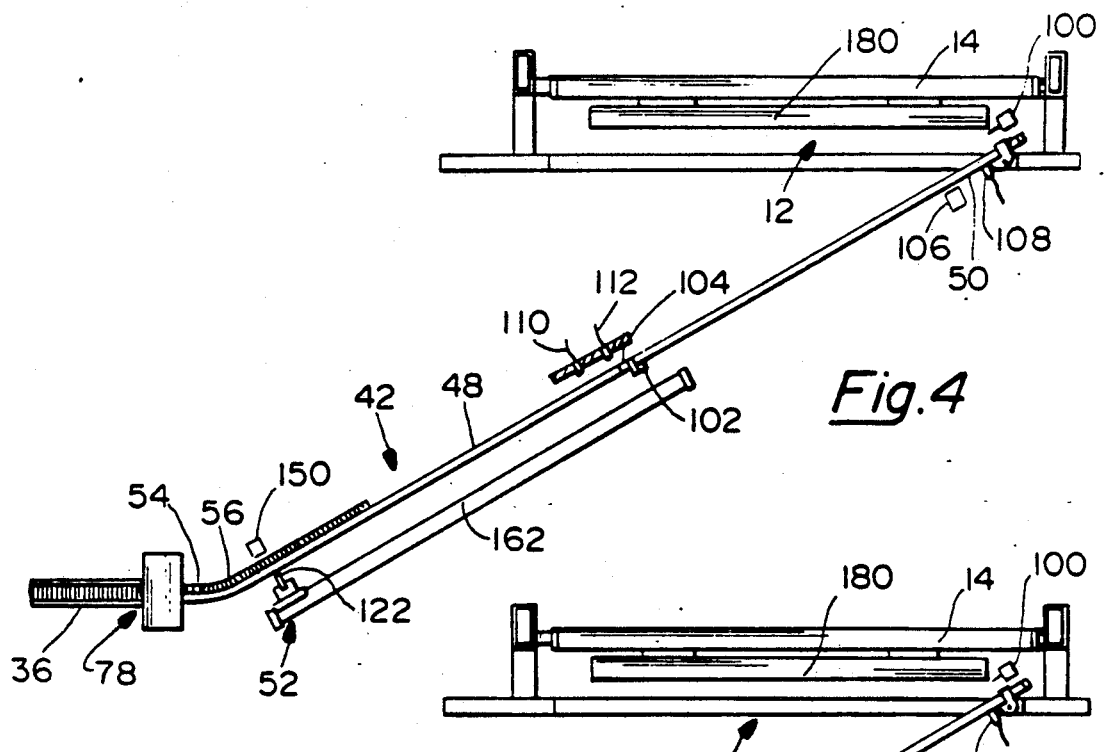
Fig.4
Fig.5
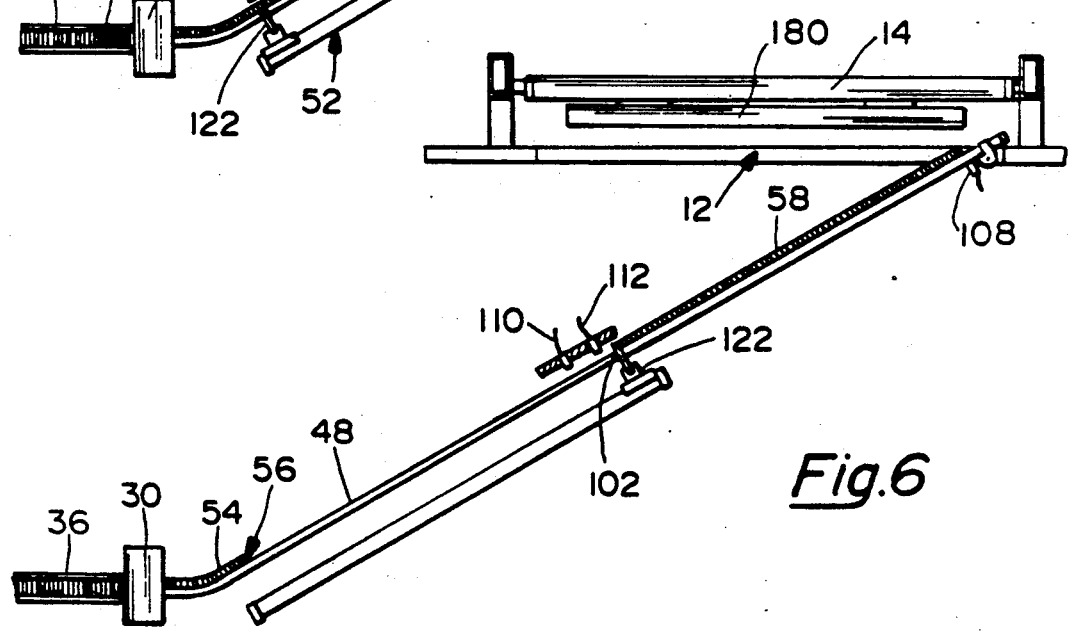
Fig.6

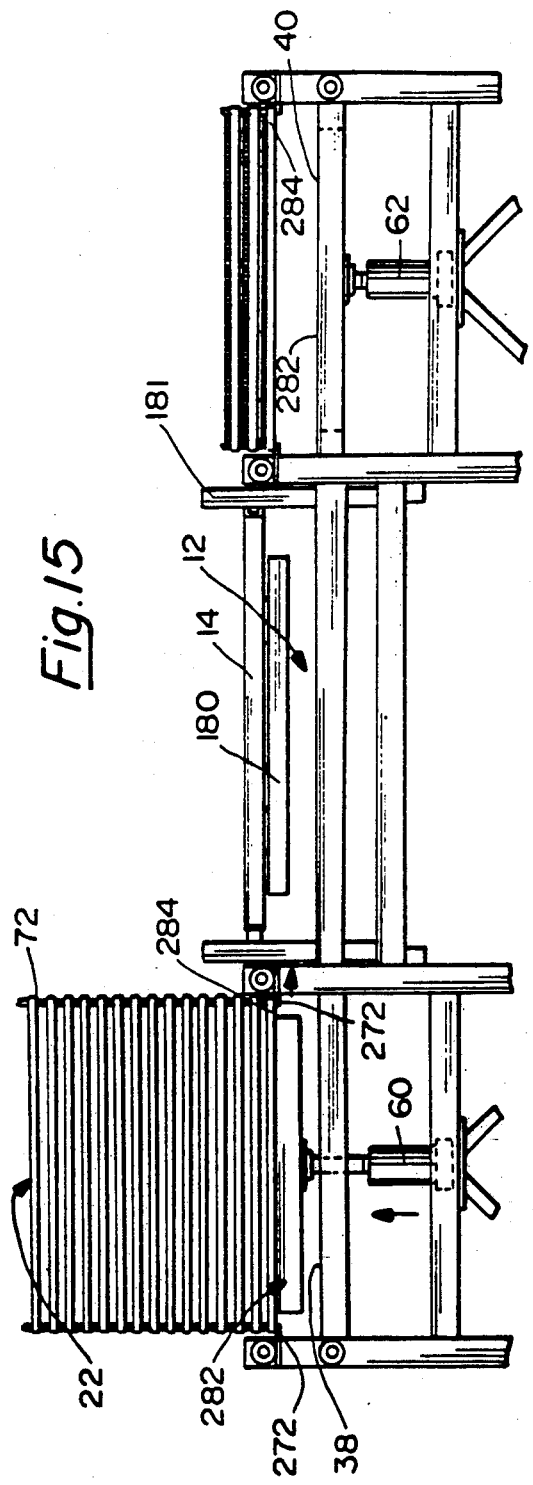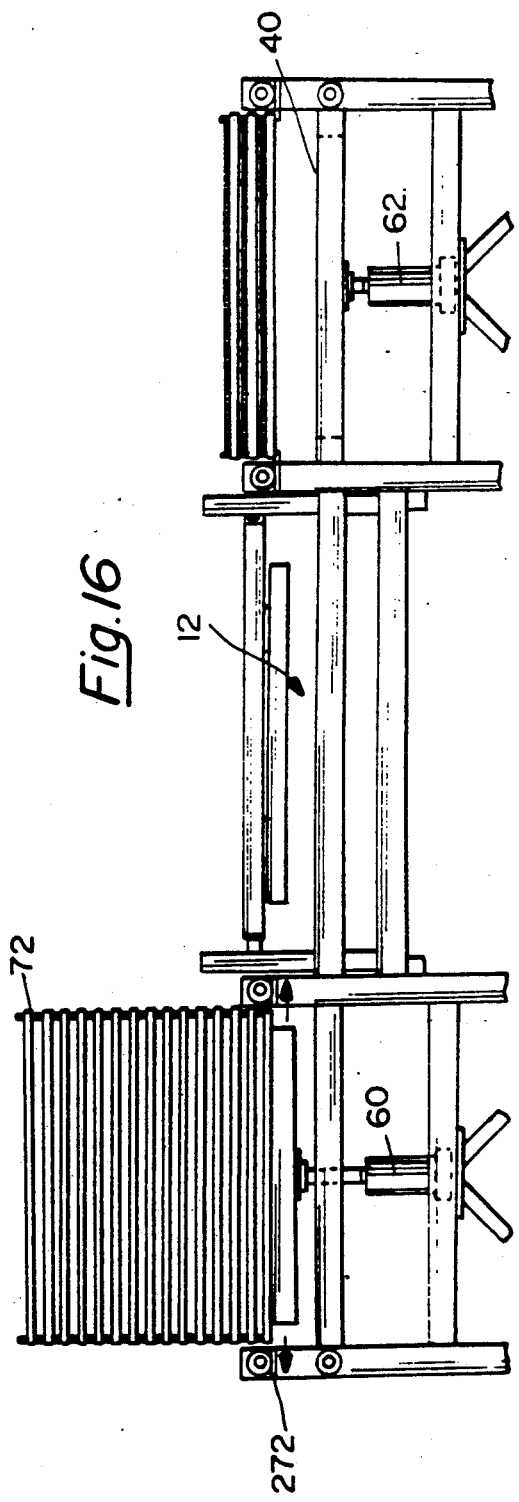

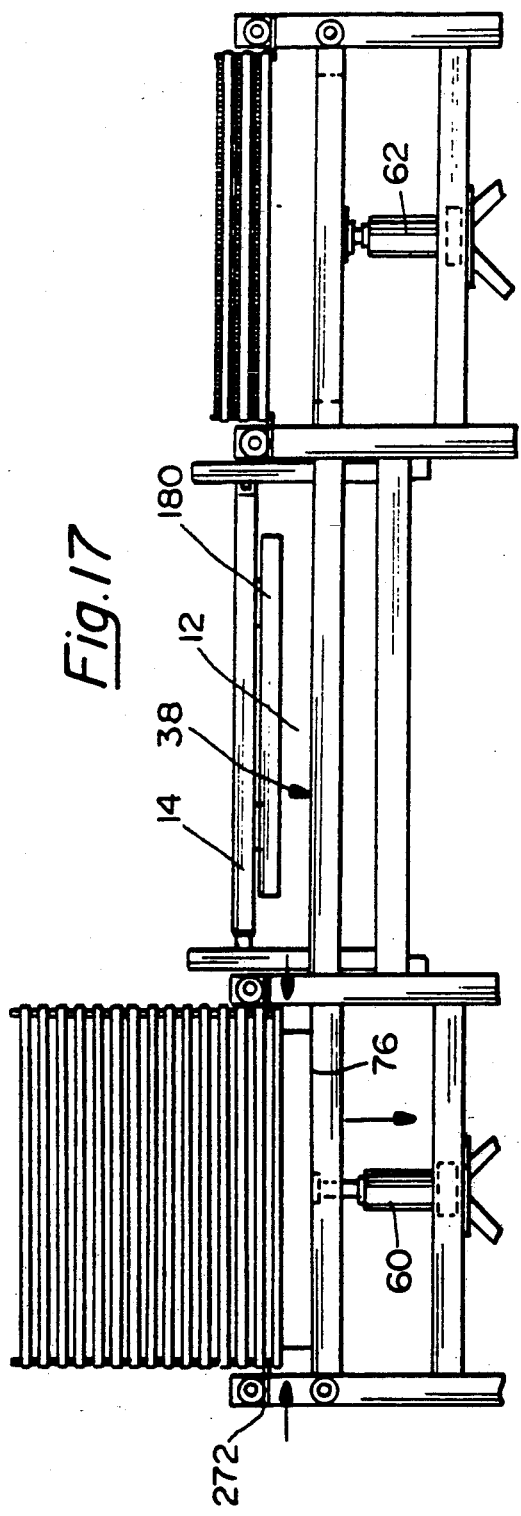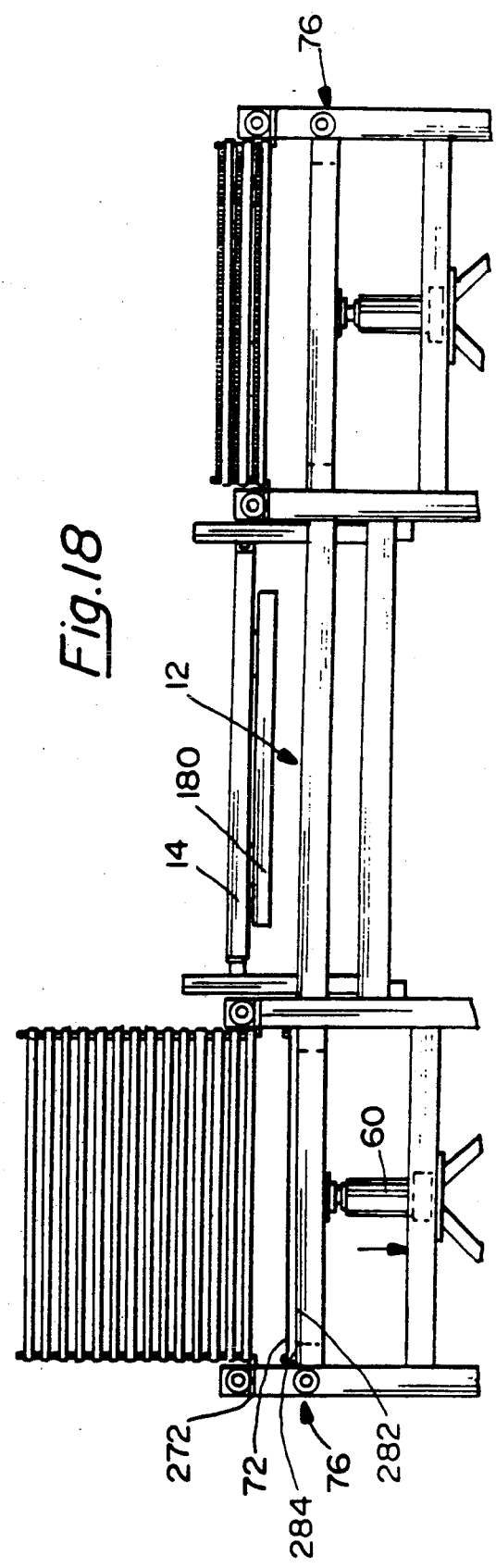

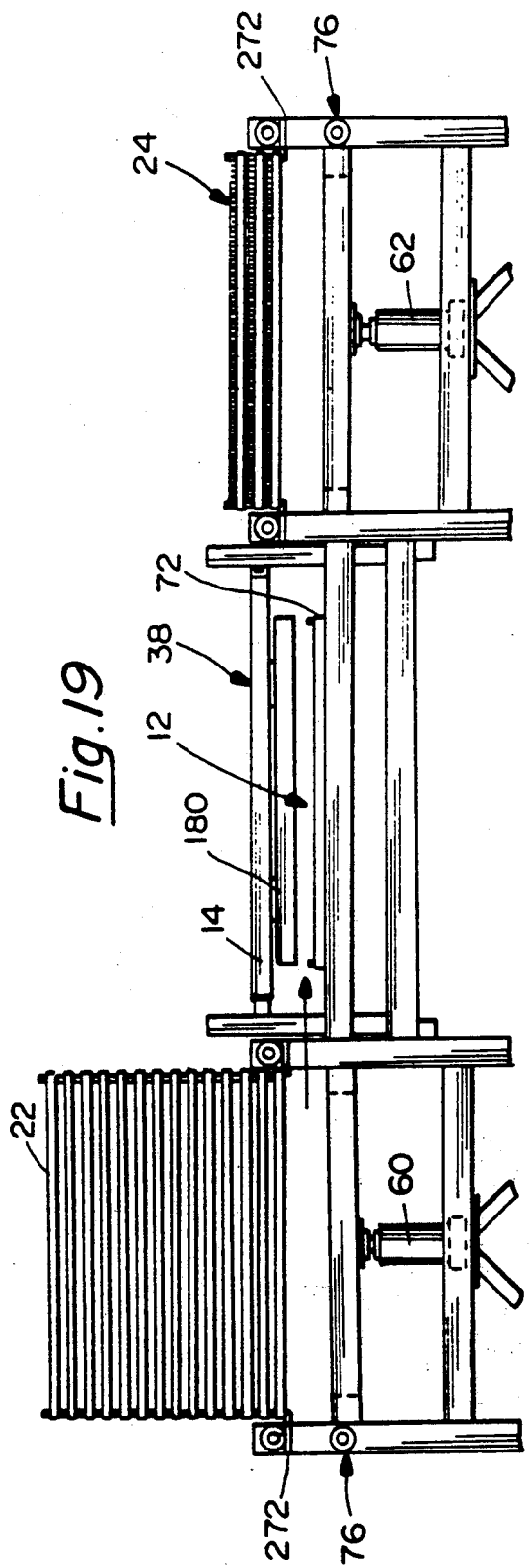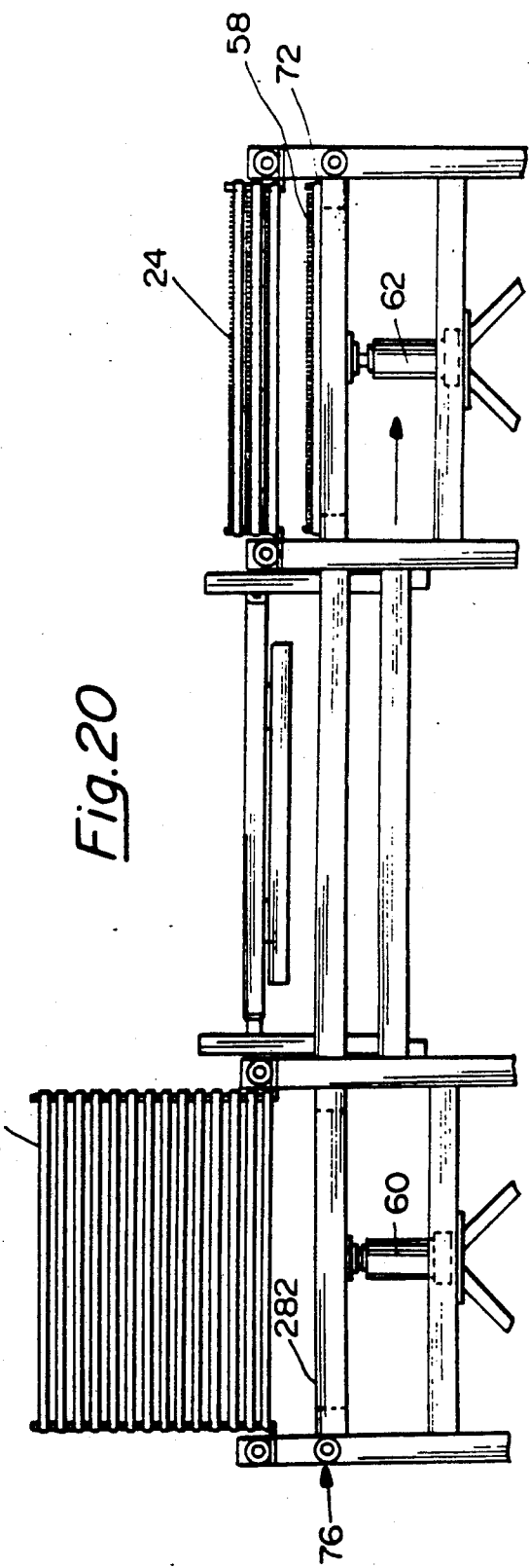

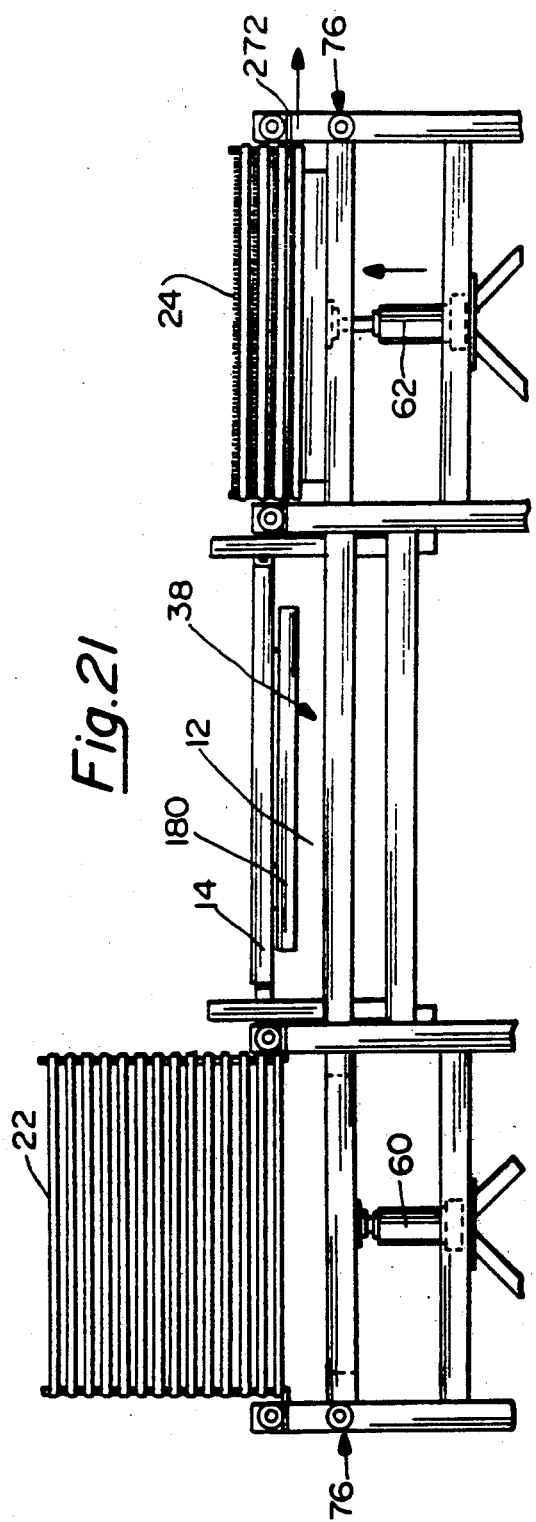
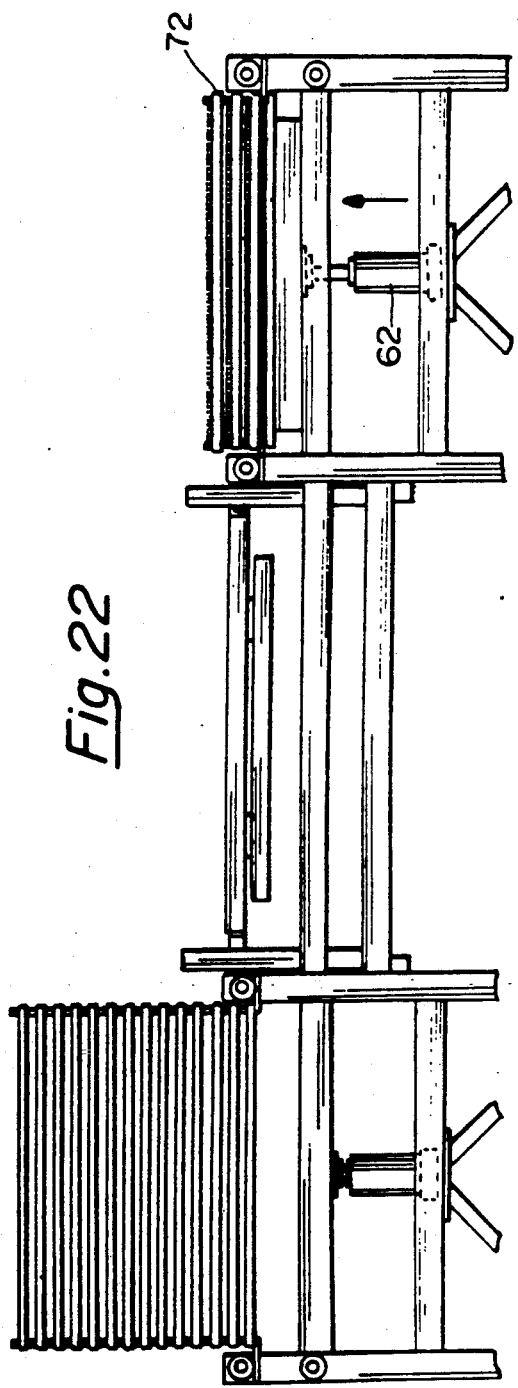
Fig.21
Fig.22

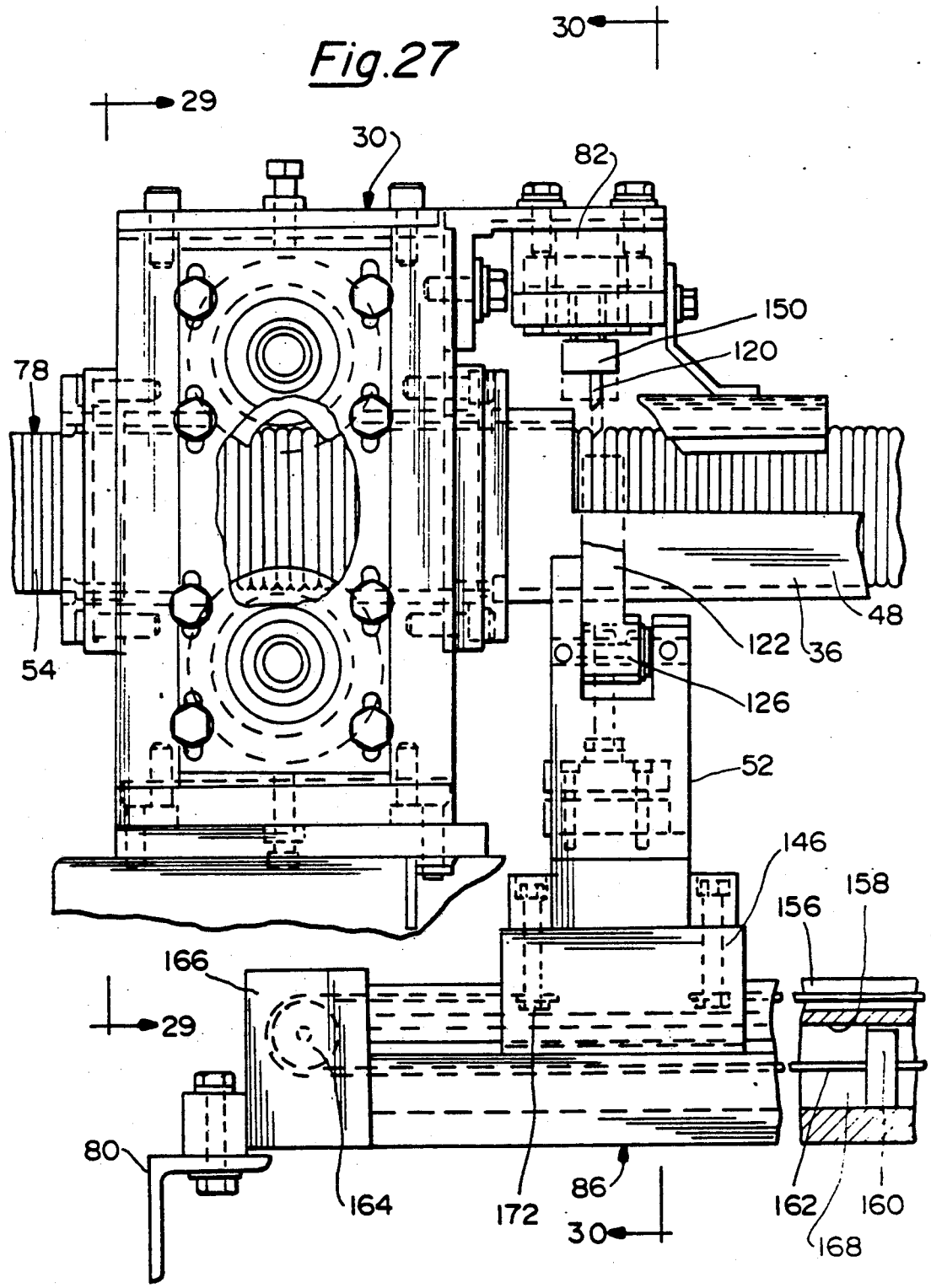

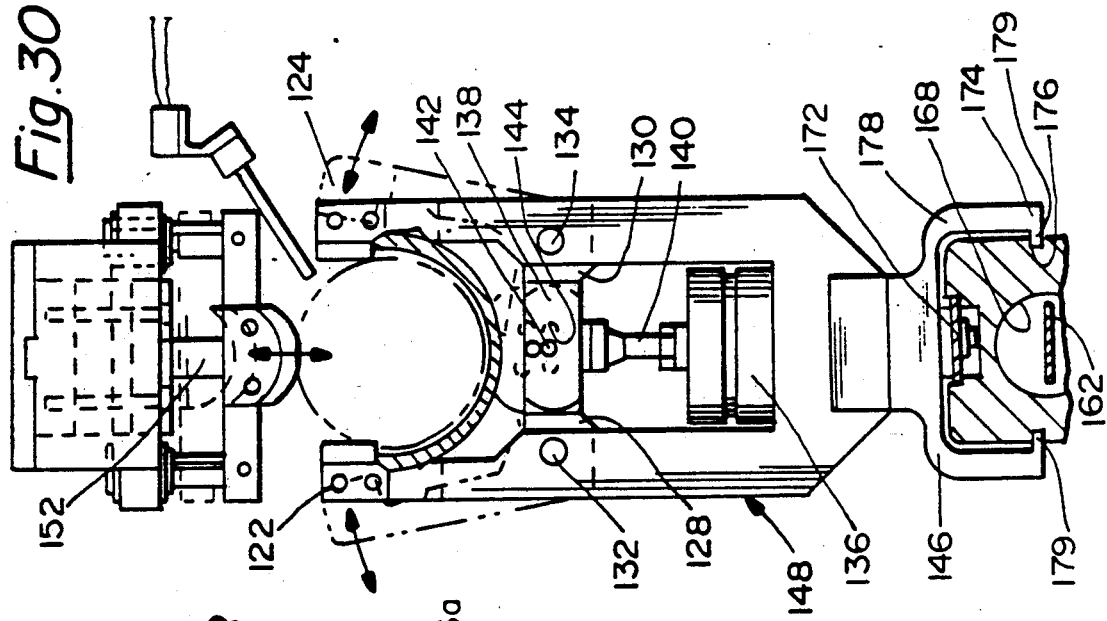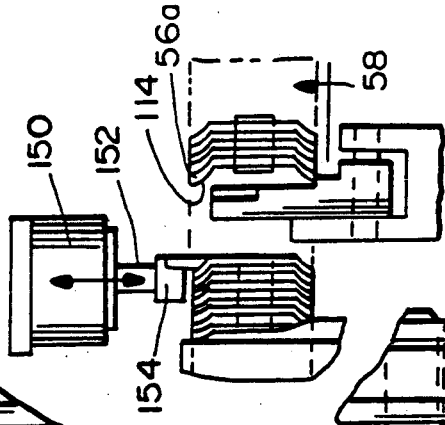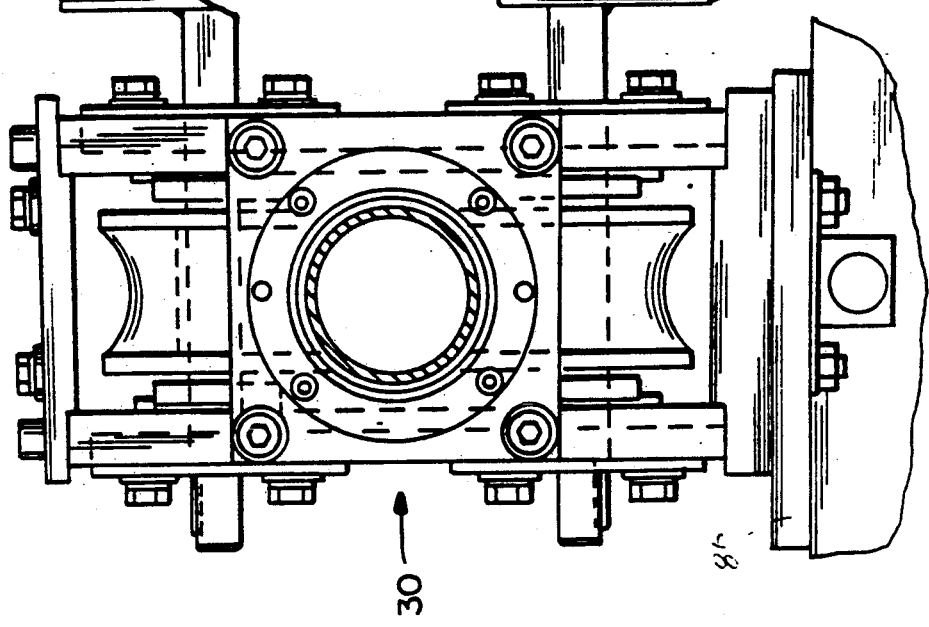

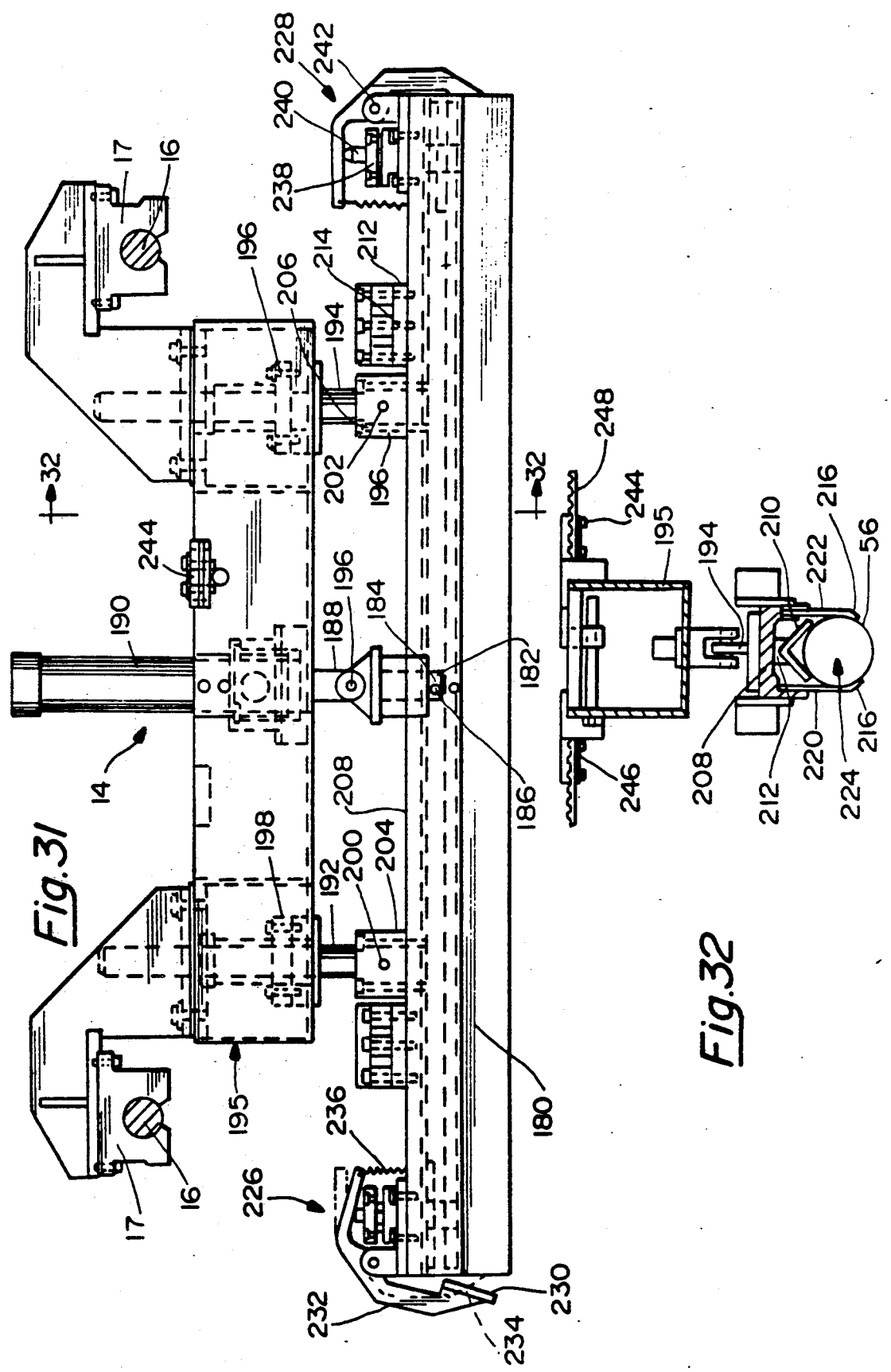

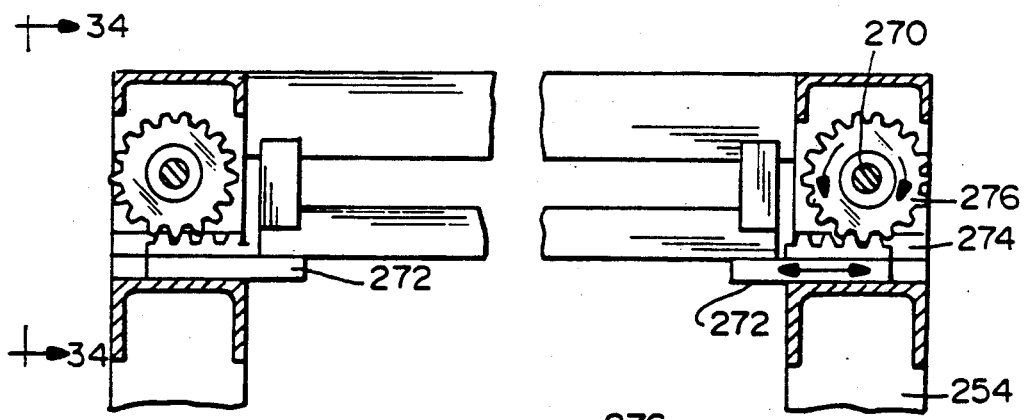
Fig.33
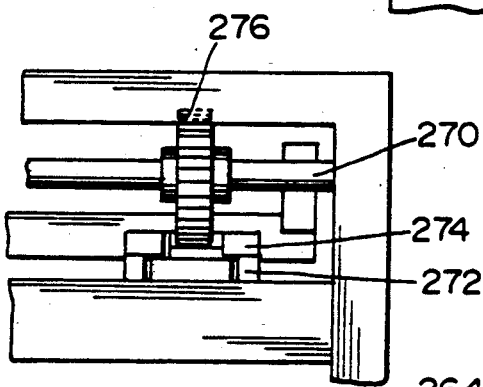
Fig.34
Fig.35
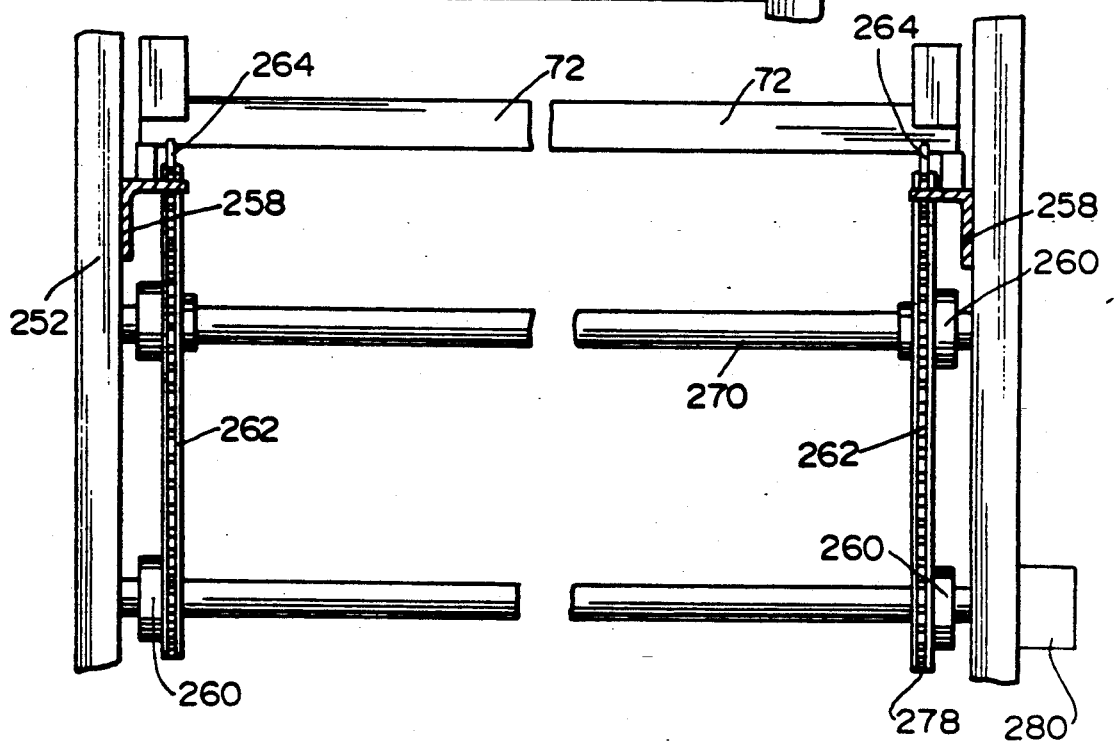

HIGH SPEED/HIGH CAPACITY AUTOMATED WORKLOAD REGULATOR

BACKGROUND OF THE INVENTION

The present invention generally relates to apparatus and methods for continuously, automatically and dynamically regulating the flow of manufactured articles in an automated multi-step manufacturing setting. More particularly, it relates to a new and improved automated workload balancer for use in automated manufacturing lines having an improved transfer and storage arrangement and improved article management features adapted to provide article handling rates of above about 5,000 articles per minute, and preferably between about 7,500 about 10,000 articles per minute.

An automated workload regulator apparatus for use in automated manufacturing operations is known from U.S. Pat. 4,808,057 issued Feb. 28, 1989 and U.S. Pat. No. 4,983,095 which issued Jan. 8, 1991, both of which are assigned to the same assignee as the present invention. In accordance with the apparatus and method defined in these patents, the preferred articles are can lids or ends which are stamped from a roll or sheet of metal stock at a first stamping operation and work station. The stamped can ends are transferred to successive downstream workstations where a number of subsequent manufacturing operations are or may be performed including: a shaping operation whereat the curled edge portion is imparted to each can end which is subsequently used in securing the can end to a can body; liner operations, wherein various coating compounds are applied to the inside surface of the can end preparatory to sealing of the can end to a can body; drying operations, to dry or cure the coatings applied in the liner operations; conversion press operations, wherein the easy open score lines and pop-top tab rings are stamped and affixed to each lid, respectively; packaging operations, wherein a predetermined number of can ends are packaged in a tubular paper sleeve wrapper in trays or boxes, and finally, palletizing and shrink or stretch wrapping operations, wherein sticks or packaged sleeves of can ends are stacked onto a pallet and wrapped in heat-shrink or stretch type plastic wrap for safe-keeping in temporary storage.

The balancer apparatus is positioned between two adjacent work stations to promote maximum, through-put or output from the overall manufacturing operation by permitting uninterrupted operation of at least one of the workstations at its desired operating rate even though the other workstation is experiencing an intermittent or variable operating rate.

The apparatus described in the aforementioned patents includes a transfer station having an associated inbound staging area, an outbound staging area and a storage area. As shown in the patent drawings, the inbound staging area and the outbound staging area each comprise a plurality of adjacent parallel lanes and preferably the inbound and outbound staging areas are disposed in adjacent, side by side relation in a common horizontal plane extending through the transfer station. The storage area is defined by a horizontal conveyor extending parallel to the staging areas but spaced vertically below the staging areas. A gap or separation is provided between the inbound and outbound lanes at the transfer station. The horizontal conveyor is designed to receive and index a storage tray having a plurality of parallel troughs or receptacle portions, each for receiving a stick of can ends, in either of two horizontal directions, e.g. into or away from the transfer station.

A transfer head having gripping and releasing means for grabbing a stick of can ends is positioned at the transfer station and is capable of a limited range of movement along the two axes in the transfer station. The transfer head can move a stick of ends from an inbound lane at the inbound staging area to an outbound lane at the outbound staging area or it can move the stick from the inbound lane downwardly to a centrally positioned empty trough in the storage tray positioned at the central location in the transfer station. In addition, the transfer head may grip a stick of can ends from a trough in the storage tray and deposit it in an outbound lane.

The balancer apparatus described in these patents further includes an empty container magazine and a full container magazine located at the opposed ends of the horizontal conveyor, respectively. Each magazine includes elevator means for upstacking or downstacking a given number of storage trays and for cooperatively loading them one at a time from magazine storage onto the horizontal conveyor for indexing through the transfer station.

In accordance with the apparatus and its mode of operation, a number of sensors and a controller module determine the cumulative inbound rate of can ends or rather the sticks of can ends being deposited in the lanes at the inbound staging area. Moreover, the controller also determines a cumulative outbound rate which is the rate at which sticks of ends are being withdrawn from the outbound lanes of the outbound staging area. The transfer head moves one group or stick of ends at a time and removes sticks from the inbound staging area at a first pick up rate equal to the cumulative inbound rate. The transfer head also places sticks of can ends in the outbound staging area at a placement rate equal to the cumulative outbound rate. The controller and apparatus balances the pick up rate with the placement rate by directing the transfer head to additionally transfer a sufficient number of groups to and/or from storage so that a desired regulated flow is achieved or maintained by the overall operation.

In accordance with this apparatus, the storage tray conveyor and respective magazines permit continuous regulated flow to occur even when one of the work stations is experiencing interrupted operation for any time period. In a start-up sequence, for example, a supply of empty storage trays equal to a maximum number of trays that can be handled by either of the magazines is loaded into the empty tray magazine. The transfer head is programmed to load each stick of can ends arriving at the inbound staging area into a receptacle portion or trough in a storage tray. Accordingly, a first empty tray ,s deployed from a stack of empty trays in the empty tray magazine onto the horizontal crossfeed conveyor. The tray is moved to the transfer station and then indexed therethrough as the transfer head places sticks of can ends one stick at a time into a receptacle trough portion. This series of steps is repeated until all of the receptacle portions of the storage tray are filled. Thereafter, the filled tray is moved by the conveyor to the filled container magazine.

At the filled container magazine, a lift engages the bottom of the filled storage tray and raises it to an extended position. Thereafter, side mounted holder fingers are actuated to an inwardly extended position wherein the fingers are located under the edges of the raised storage tray. The holder fingers may also be actuated to a retracted position out of the path of the lift area. Once the trays have been shifted and the holder fingers have been moved to their inwardly extended position under the stack of filled storage trays, the lift mechanism is lowered until the lowermost tray rests o the extended holder finger supports in a raised and stored position within the filled container magazine spaced above the crossfeed conveyor. This start-up sequence is repeated until a desired number of trays are filled which are loaded into the filled tray magazine.

In accordance with the apparatus and method described in this patent, a fixed number of storage trays may be shuttled back and forth between the filled container magazine and the empty container magazine, as required in operation. The apparatus described in U.S. Pat. No. 4,808,057 was designed for use in can end manufacturing systems having operating rates of between about 2,000 to about 5,400 or more ends per minute. Typically, ends are stamped in a stamping press and are then passed through curl wheels to impart the curled peripheral lip portion. Good operating rates with these systems are generally from about 2,500 to 4,000 ends per minute.

More recently, advances have been made in the stamping and forming operations. More particularly, new and improved end die presses have been developed which stamp the can ends from rolled and sheet stock and simultaneously provide the peripheral curled lip portion in a single or dual stroke of the stamping die. These newer die curl presses are running at 250 strokes per minute and are expected to be able to perform at rates of 300 to 350 strokes per minute in the future. In this modern manufacturing context, a typical die may produce as many as 28 can ends for each stroke and at an operating rate of 300 strokes per minute, the modern stamping operations are expected to be producing at least about 8,400 can ends per minute.

This four-fold increase in production rate must be matched or accommodated by the operating rates and capacities of either the related workstations or the automated workload balancers required between workstations in the production line. Pressure to improve the operating rates of each successive workstation has also been prompted by this improvement in stamping operations. The balancer described in the above-mentioned patent and patent application has a practical upper limit of about, an operating rate of about 5,400 ends per minute, which rate is insufficient for more modern manufacturing operations.

More recently an improved, high capacity workload balancer apparatus has been introduced which is described in copending commonly assigning U.S. application Ser. No. 787,730, filed Nov. 4, 1991, which is a Continuation of U.S. application Ser. No. 550,476 filed Jul. 10, 1990 now abandoned. The new and improved balancer apparatus described in this application achieves increased transfer rates by a modification of the transfer mechanism and its movements. Instead of having a storage tray being indexed under a central location of a transfer station to present one article stick receiving trough at a time to the transfer head, a storage tray is positioned in parallel side by side relation to the inbound lanes, the outbound lanes, or both, within the operating range of motion of the transfer head. In accordance with this modification, the transfer head can move overhead to any designated lane and to any designated trough positioned at the transfer station. In addition to increasing the rate of transfer with the more flexible movement capability of the transfer head, the balancer described in this application includes an increased capacity storage facility. More particularly, at least one elevator module is provided having a shaft extending through the transfer station. A pallet of trays may be advanced on demand to the elevator shaft and one tray at a time may be presented through the transfer station. When an entire pallet of trays is filled up or emptied, the pallet is advanced out of the elevator shaft to a pick up area. A fork lift operator may remove a pallet of filled storage trays out of the line at this point if necessary. In accordance with this aspect of the improved balancer the pallet/elevator arrangement manages groups of groups trays for increased storage capacity whereas the earlier conveyor/magazine storage arrangement generally managed a single group of trays at a time. The higher capacity balancer equipped with a dual transfer head and dual elevator system is rated at speeds above about 6,000 to about 8,000 articles per minute or more. The pallet and elevator systems however are relatively expensive and undersirably increase the cost of the overall balancer apparatus.

Accordingly to further improve upon the prior art automated balancers, it is an object of the present invention to provide a new and improved automated workload balancer apparatus capable of accommodating operating rates above about 5,000 articles per minute and preferably between about 7,500 to about 10,000 articles per minute at a reduced overall cost.

It is another object of the present invention to provide a new and improved automated workload balancer having an improved transfer station and transfer mechanism including an increased number of lanes and a new and improved transfer head assembly having an expanded range of reciprocal movements within the larger transfer station.

It is a further object of the present invention to provide a new and improved high speed and high capacity balancer apparatus capable of maintaining the articles to be moved in a desired transfer orientation and configuration.

SUMMARY OF THE INVENTION

In accordance with these and other objects, the present invention provides a new and improved automated workload balancer for automatically regulating a flow of articles between a first work station whereat a plurality of strings of articles are produced at a first variable cyclic operating rate, and a second downstream work station whereat an operation is performed on said plurality of strings of produced articles at a second variable cyclic operating rate, such that at least one of said work stations may continue in uninterrupted operation and at a desired operating rate when the rate of operation of the other work station is temporarily varied or interrupted.

The automated balancer comprises a transfer station, which may generally be considered to be a raised elongate horizontal planar location having a longitudinal axis extending parallel to the floor upon which the apparatus rests. An inbound staging area is provided at the transfer station, whereat a plurality of pre-formed groups of said produced articles, e.g. sticks of can ends, are temporarily accumulated prior to transfer. The inbound staging area includes a plurality of inbound lanes, each lane being adapted to receive a succession of the aforesaid groups of articles.

The apparatus also includes an outbound staging area at the transfer station. The outbound staging area is the area at which groups of produced articles are temporarily accumulated prior to advancement to the downstream or second work station. The outbound stating area is also defined by a plurality of outbound lanes, with each lane being adapted to receive a succession of the groups or sticks of articles.

At least one storage tray load/unload area is also provided at the transfer station adjacent the inbound staging area, the outbound staging area, or preferably both. A transfer head is provided at the transfer station which includes means for gripping and releasing a group or stick or articles. In accordance with this invention, the transfer head is positioned above the areas of the transfer station and is independently reciprocally movable along a longitudinal axis extending parallel to the longitudinal axis of the transfer station. The gripping and releasing means on the transfer head includes gripping jaws which are reciprocally movable in a vertical direction, including a lowered or extended position at the transfer station and an upwardly retracted or raised position spaced above the transfer station. The transfer head and gripping jaws are free to travel above the lanes extending along the longitudinal axis of the transfer station including the lanes at the inbound staging area, the lanes at the outbound staging area or the extra lanes formed by the stick receiving receptacle groove portions defined in each storage tray when the storage tray is in its load/unload position at the transfer station.

In accordance with this invention, the apparatus includes at least one modified magazine and conveyor storage subassembly. The storage subassembly or arrangement includes a plurality of storage containers or trays, each container have a plurality of storage areas or troughs for receiving a plurality of being-manufactured articles arrayed in individual groups. A magazine for receiving a plurality of containers filled with articles and a magazine for accommodating or receiving a plurality of empty containers are provided. The storage arrangement further includes means for positioning one container being filled or emptied to a load/unload position in the transfer station so that the containers may serve as a variable capacity transient storage area for the purpose of balancing inbound and outbound quantities of the articles. Preferably, the groups of articles form an elongate stick or group having a given or predetermined length dimension. In accordance with this invention, a container conveyor means is provided for reciprocally moving a container from the empty tray magazine, into the transfer station, and thereafter, from the transfer station into the filled tray magazine. Preferably, each of these conveyor stops are linearly aligned along a conveyor axis which preferably extends generally perpendicularly with respect to the longitudinal axis of the transfer station. Moreover, the storage containers are conveyed along the conveyor axis so that the axial length dimension of a stick receiving trough or a stick of articles placed therein is parallel the longitudinal axis of the inbound and outbound lanes and disposed generally perpendicular with respect to the longitudinal axis of the transfer station. In a preferred embodiment, a storage container conveyor/magazine assembly is provided at each of the opposite ends of the transfer station, adjacent the inbound lanes and the outbound lanes, respectively. As has already been mentioned, the transfer head is capable of moving along the entire length of the longitudinal axis of the transfer station from one magazine/conveyor assembly across the inbound and outbound lanes to the other magazine/conveyor assembly.

In accordance with an especially preferred embodiment of the apparatus, the inbound lanes and the outbound lanes are each provided with article management means for maintaining the articles in a given stick in a proper orientation and configuration for transfer. More particularly, in accordance with this preferred embodiment, holder means and pusher means are provided in each of the inbound and outbound lanes to prevent article fall-over or outer article misplacement which may foul a lane. Preferably the infeed and outfeed lanes are angled with respect to the floor upon which the balancer rests and transfer station, so that the influence of gravity may be relied upon in part to prevent the leading portion or trailing portion of each stick of articles from falling over or becoming misaligned or disoriented with respect to the other articles of the stick or the lane along which the stick is being advanced. In accordance with this preferred feature means are provided along the infeed lanes to push the articles up hill or against the influence of gravity along the path of advancement into the inbound staging area and means are provided for holding each stick in each lane at its opposed ends at the staging area to maintain all of the articles and especially the end most ones in a given stick in proper stick configuration for transfer. Similarly, in the outfeed lanes, means are preferably provided to guide the articles downhill in the direction of the influence of gravity along the path of advancement until a consolidation unit rejoins successive sticks to reform a string of articles for transfer to a downstream workstation.

In accordance with the new and improved balancer operation, a plurality of strings of stamped and formed can ends or other manufactured articles are fed from the first work station toward the inbound staging area in plural inbound feeder lanes. A leading portion of each string in each inbound feeder lane is subdivided to define a group or stick of can ends or articles from the remainder of the string. The leading portion may be subdivided by successively counting off a predetermined number of articles or by successively measuring of a predetermined leading length along the string of articles to form the stick.

Each group of articles is separated from the remainder of the inbound string by advancing the group to the inbound staging area as the next succeeding group is being formed. A detector and controller means continuously determines a cumulative inbound rate equal to the rate at which successive groups in the plural lanes are being advanced into the inbound staging area.

The transfer head is used to remove groups of articles from the inbound staging area, one lane at a time, at a pick-up rate substantially equal to the cumulative inbound rate. The transfer head is also used to transfer groups of articles, one group at a time, to an outbound lane in said outbound staging area at a placement rate. Article groups ar withdrawn from the outbound staging area by moving each group along an outbound lane to said second downstream workstation, the moving step includes the step of consolidating successive groups to re-form a string of articles in each outbound lane.

A cumulative outbound demand rate is monitored and determined in the apparatus which is equal to the rate at which groups of articles must be withdrawn to provide a sufficient supply of articles to maintain a desired rate of operation at the second work station.

The transfer rate is adjusted so that the placement rate is substantially equal to the outbound demand rate. The balancer control balances the pick-up rate with the placement rate by directing the transfer head to additionally transfer a sufficient number of groups to and from a storage tray, so that the desired regulated flow is achieved.

Other objects and advantages provided by the present invention will become apparent from the following Detailed Description of the Drawings in which:

BRIEF DESCRIPTION OF THE DRAWINGS

FIG. 4 is a side elevation view, partly schematic in nature, of the new and improved angled infeed arrangement in accordance with the preferred embodiment and showing a string of can ends being urged along an infeed lane;

FIG. 5 is a side elevation view similar to FIG. 4, and showing the beginning operation of subdividing a predetermined length of ends to form a stick from the remainder of the string;

FIG. 6 is a side elevation view similar to FIG. 4-5, which shows the subdivided stick of ends in an advanced and separated position wherein the ends are received below the inbound staging area in a pivotable and segment of inbound track or lane;

FIGS. 15-23 are side elevation views of the storage magazine/conveyor assemblies illustrating the sequential operating steps of raising the lift platform in the empty tray magazine until the lowermost tray of the empty tray stack is contacted, retracting the tray support fingers while lifting the entire stack of empty trays, lowering the lift platform an incremental amount and reinserting the tray support fingers under the lower surface of the second tray and between the lowermost tray and the second, next to the lowest tray, lowering the platform until the lowermost tray is deposited onto the conveyor assembly, advancing the empty storage tray rightwardly into position in the load/unload area in the transfer station for filling one receptacle or trough area at a time until the tray is filled, advancing the filled tray further rightwardly into position in the filled tray magazine, rasing the lift platform and filled tray upwardly off the conveyor until the filled stack of trays is contacted, lifting the entire stack of filled trays while retracting the tray support fingers until the newly filled tray is disposed above the tray support fingers and reinserting the tray support fingers inwardly and lowering the lift platform until the stack of filled trays is again supported above the conveyor in the filled storage magazine, respectively.

FIG. 27 is an enlarged side elevational view of a part of the separator/accelerator until with portions broken away, and with other portions in section, showing parts of the integrated mover unit, certain elements of the splitter mechanism and the separator advancer mechanism used to subdivide the continuous array of incoming articles into individual groups;

FIG. 28 is a side elevational view, partly diagrammatic in nature, and showing further details of the operation of the separator mechanism used to subdivide the articles into groups;

FIG. 29 is a vertical sectional view of the integrated mover unit of FIG. 7, taken along lines 29-29 thereof;

FIG. 30 is an end elevation view of the splitter and separator acceleration jaws of the infeed advance mechanism taken along view lines 30—30 in FIG. 27;

FIG. 31 is a side elevational view of the article group transfer means of the apparatus, including the pick-up head;

FIG. 32 is a vertical sectional view of the pick-up head and head positioner of FIG. 31, taken along lines 32—32 thereof;

FIG. 33 is an enlarged vertical sectional view, with portions broken away, and showing portions of the container support elements and the support finer drive mechanism in the magazines;

FIG. 34 is an end elevation view of the drive mechanisms taken along view lines 34—34 in FIG. 33;

FIG. 35 is an enlarged view, partly in elevation party in section showing elements of the container support system and the storage container conveyors in each of the magazine assemblies;

DETAILED DESCRIPTION OF THE INVENTION

Figure 36:
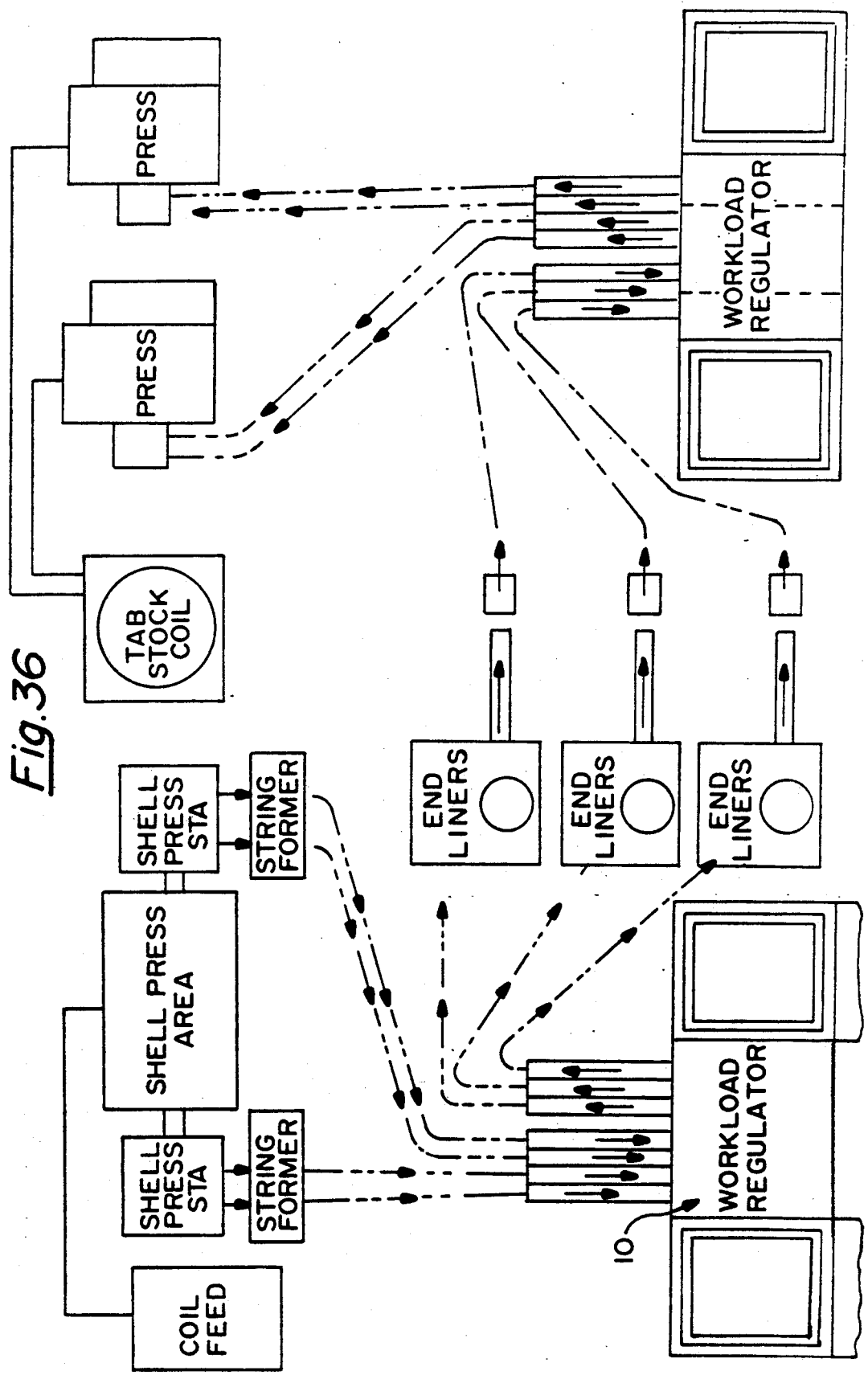
FIG. 36 is a top plan view, schematic in nature and showing the use of the balancer in a can manufacturing operation wherein the articles being manufactured are easy-opening can ends.

Referring now to FIG. 36, a schematic illustration of the end forming operations is illustrated. As depicted in FIG. 36, a coil of sheet metal stock is stamped in a shell press area to form a plurality of can ends. These are fed from the shell press into a string former which forms them into a continuous string of ends which is fed along inbound feeder lanes into an inbound staging area of the new and improved workload balancer 10 of the present invention. The workload balancer 10 first separates sticks of articles from the incoming string feed and advances them into an inbound staging area of a transfer station. A plurality of lanes for receiving outgoing sticks of articles is provided in an outbound staging area within the balancer device. These ends are accelerated out of the outbound staging area through a string reforming mechanism to form continuous string of can ends which are fed to a liner or other second work station. The lining or secondary work station applies a curable resin composition to the inside of the lid for sealing it to the bottom portion of the beverage can and subsequent operations.

Figure 1:
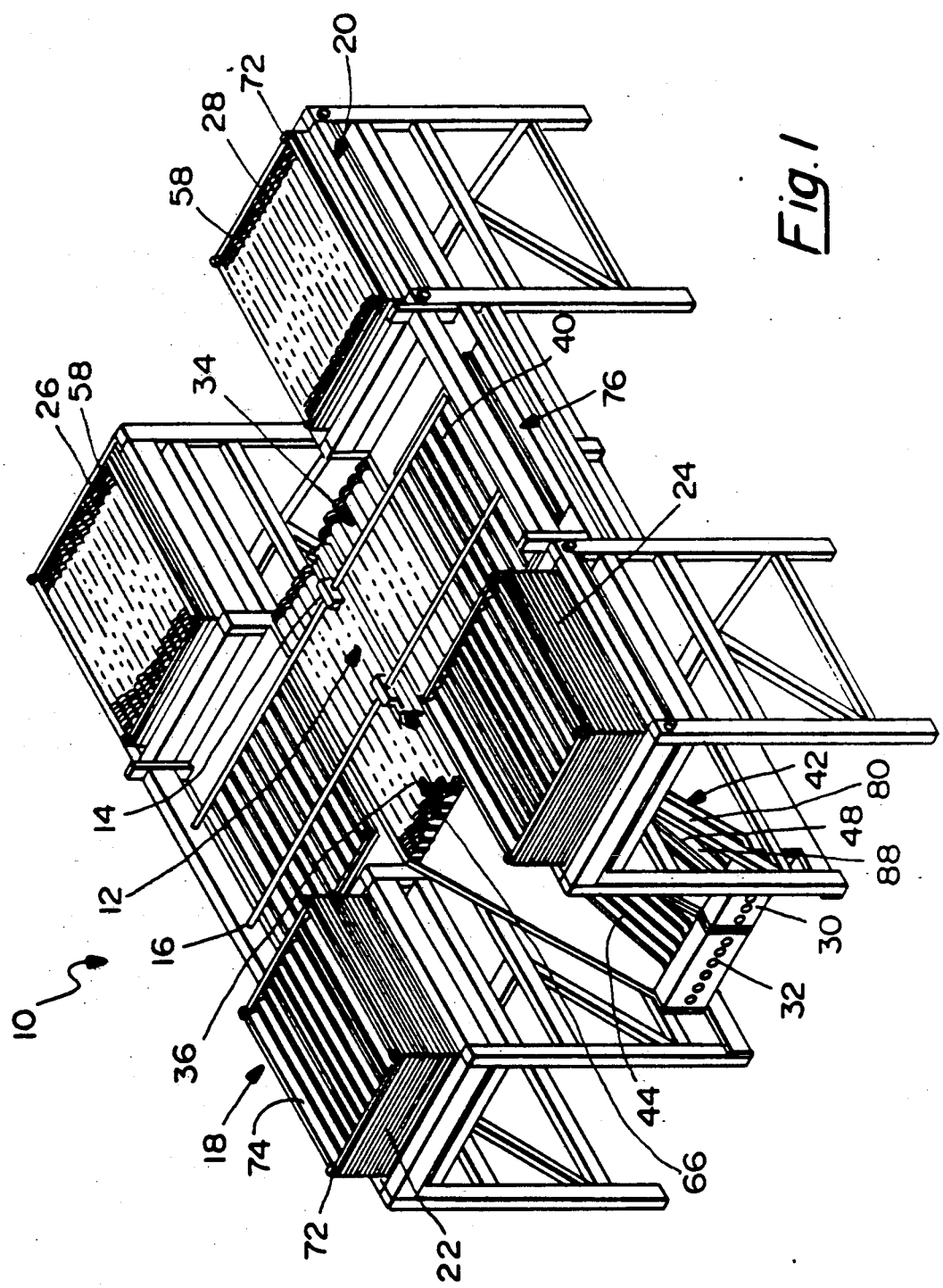
FIG. 1 is a perspective view of the preferred high speed/high capacity balancer apparatus of this invention which is specially adapted for use in regulating the flow of can ends in a modern can making manufacturing operation.

In accordance with the present context, the balancer 10 must continuously determine the cumulative inbound rate at which can ends are being advanced from the shell press area into the workload balancer. It must also determine the demand rate out required to keep the end liner secondary work station functioning and it must meet the demand out by placing sticks of can ends in the outbound lanes and advancing them from the outbound staging area into the outbound feeder lanes. Any difference between the cumulative inbound rate and the outbound demand rate must be made up in the workload balancer by directing the transfer head to transfer sticks to or from storage to put additional sticks or groups of articles for placement into the flow of the system to keep both Workstation 36 (stamping) and Workstation 2 (lining) operating at their respective desired rates. As shown in FIG. 1 after the liner operation, the ends may be dried and reformed into strings for feeding into a secondary workload balancer in preparation for sending them on their way to a third workstation whereat conversion presses add score lines and pull top tabs to the can ends before they are subsequently stored for future use.

From the foregoing explanation it will be seen that one general object of the invention is to provide apparatus and methods for insuring that the various work stations may be operated at their full instantaneous production capacities without creating supply or demand problems at the individual work stations. This is done, in simplest terms, by determining the respective rates of supply and demand for the articles, and transiently placing in storage, or taking from storage, groups of articles sufficient to supplement o diminish the rate at which articles passing through the load regulators would be supplied directly from the inbound to the outbound lanes or staging areas. If supply and demand are evenly balanced, articles are transferred in groups from the staging areas fed by the inbound lanes to staging areas adjacent the outbound lanes, without change of the inbound and outbound rate relative to each other. If not, articles are placed in or taken from storage to achieve matching of rates and regulation of workload.

A transfer from inbound to outbound may be thought of, or described as, "direct" even though it may be achieved with one or more intermediate or "idler" steps. By "direct" is therefore meant the condition wherein the inbound and outbound rates are the same and normally this means without intervening withdrawal of articles from the inbound areas or addition of articles to the outbound areas to or from storage.

Referring now to FIG. 36 and FIGS. 1-3, other principal components of the invention are shown, and these include an elongate transfer station 12 with an overhead transfer mechanism 14 which is movably positionable relative to the framing 16 forming a part of the transfer station 12. The apparatus 10 also includes a pair or storage conveyor/magazine subassemblies 18 and 20. Left and right subassemblies 18 and 20 each include magazine 22, 24 for empty trays and a magazine assembly 26, 28 for full trays. The infeed mover 30 and the outfeed consolidation assemblies 32 are shown to communicate respectively with an inbound staging area 34 and an outbound staging area 36. These areas 34 and 36 are shown in greater detail hereinafter.

Figure 2:
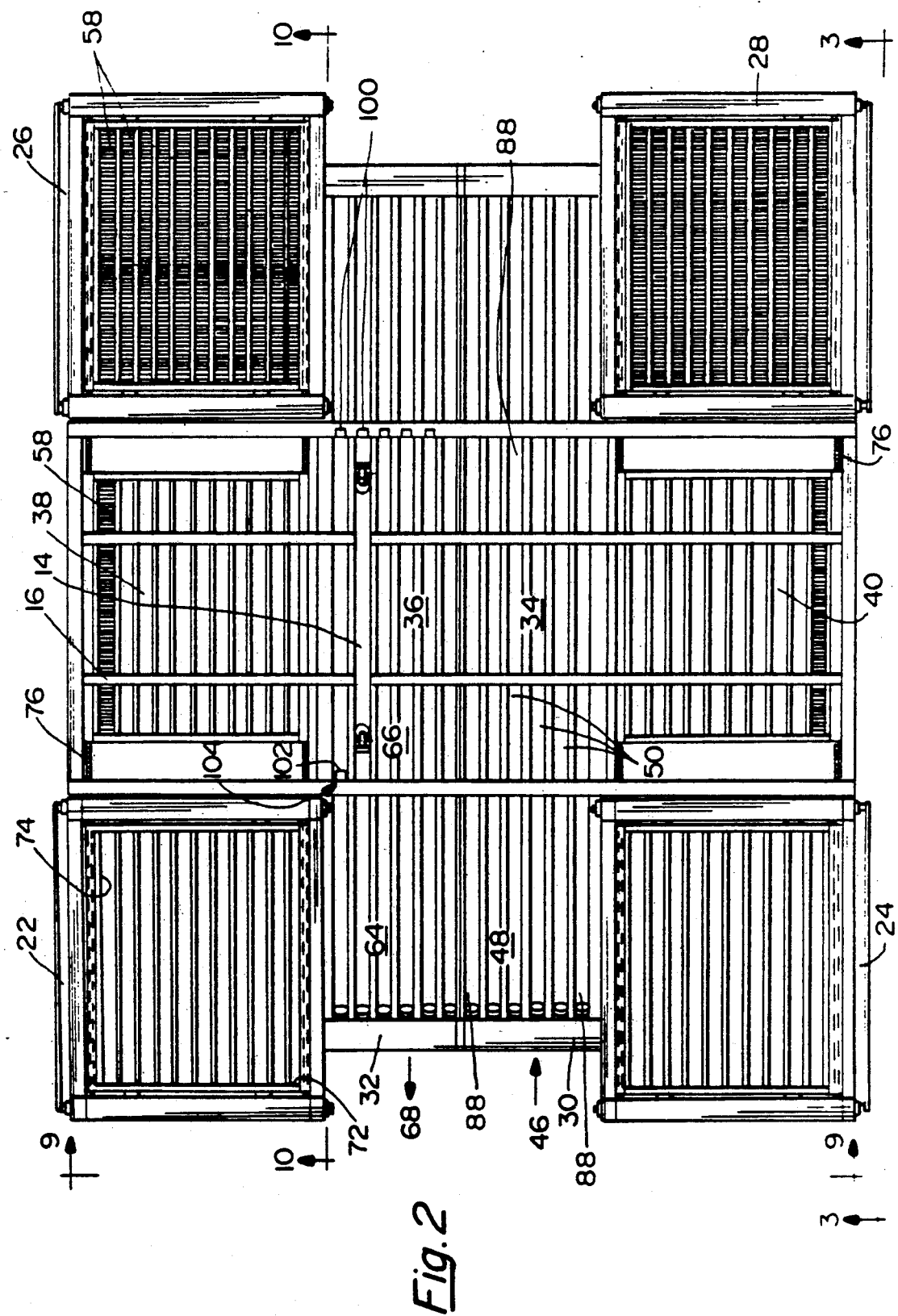
FIG. 2 is a top plan view of the preferred balancer apparatus shown in FIG. 1.
Figure 3:
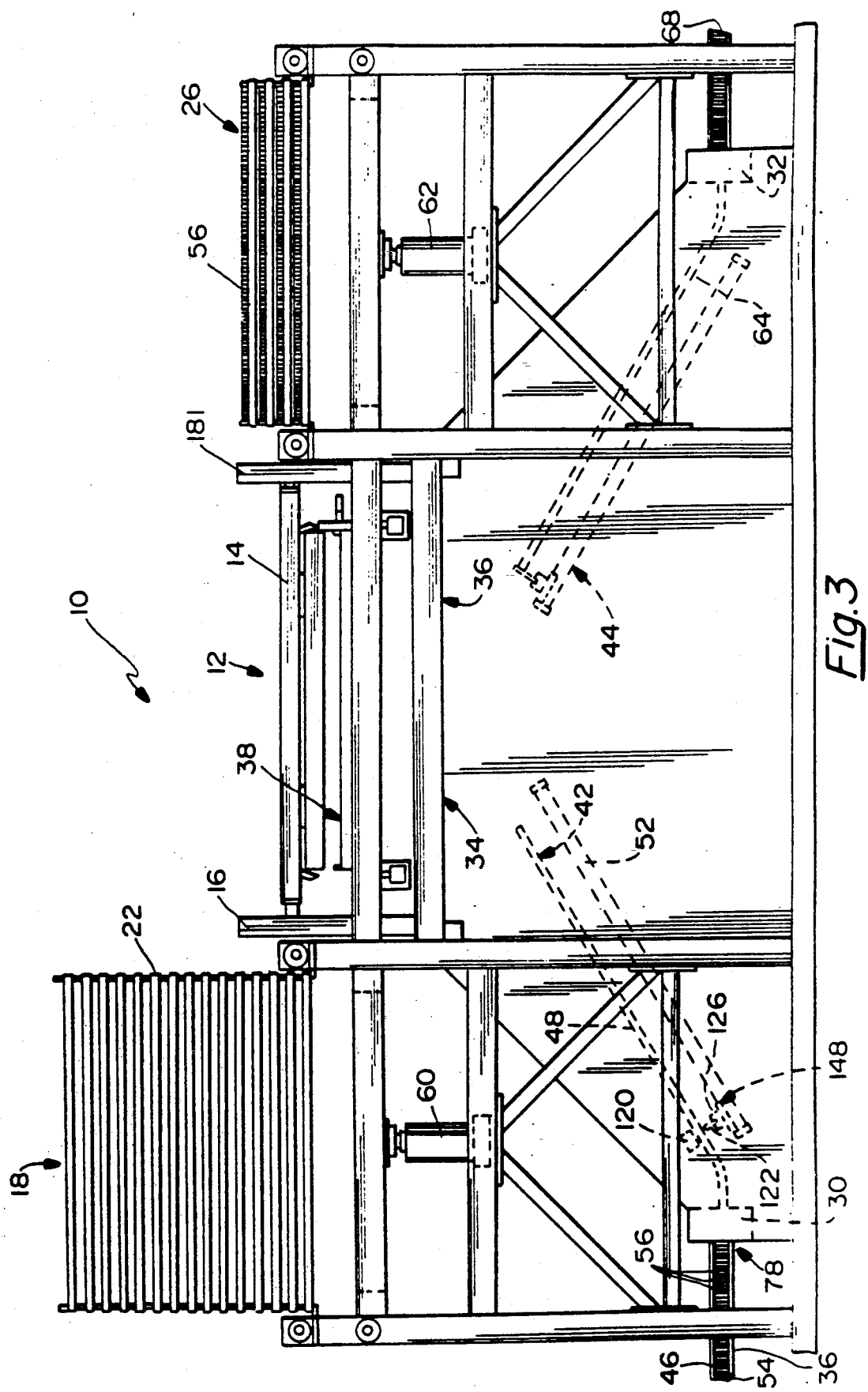
FIG. 3 is a side elevation view of the balancer apparatus, taken along view lines 3—3 in FIG. 2.

Storage deposit and retrieval areas 38 and 40 are shown to lie at the opposed ends of the transfer station 12, outbound of the inbound staging area 34 and the outbound staging area, respectively. FIGS. 1-3 also show the preferred angled infeed unit 42 and angled outfeed discharge unit 44 for the preferred device. The angled infeed unit generally includes a plurality of infeed lanes 46 from an upstream workstation, each lane including roller mover 30, an inclined feeder track 48 equipped with a rotatable track segment 50 at an upper end thereof and each lane having an accelerator/separator assembly generally designated 52. Separator units 52 are provided for subdividing a continuous array or string 54 of can ends or other articles 56 advancing in each inbound lane 46 and 48, for example, into individual groups or sticks 58.

A hydraulic piston and cylinder type lift unit generally designated 60 is shown to be provided and to form a part of the empty tray magazines 22, 24; a counterpart lift 62 is provided for the full tray magazines 26 and 28.

The angled outfeed area or unit 44 includes a plurality of inclined outfeeder tracks 64, each including a rotatable upper track segment 66 for connecting the outbound staging area lanes 36 to string conveying outbound lanes 68. The outfeed consolidator unit 32 is disposed at the lower end of the outfeeder tracks 64. An outfeeder guide jaw mechanism 70 or guide each stick of articles downhill to the outfeed consolidators 32 is provided adjacent each outfeeder track 64. The outfeeder guide jaw assembly 70 works in the opposite sense as the accelerator/separator assembly 52 insofar as the latter subdivides continuous strings 54 of articles into article groups 58 and the outfeeder jaws and consolidator 70 and 32, assemble groups 58 back into continuous strings 54, or permits sticks 58 to accumulate into continuous strings 54, for feeding into the associated outbound conveyor lanes 68 for travel to a downstream work station.

The transfer apparatus 14 which, in one mode, picks up sticks of articles 58 from the inbound staging area 34 and deposits them either in a storage container 72 positioned at the left or right hand storage and retrieval areas 38 and 40, or in the outbound staging area 36, and in another mode, picks up sticks of articles 58 from a container 72 in either deposit and retrieval area 38 or 40 and deposits them in the outbound staging area 36 for passage to the outbound lanes 68.

The transfer apparatus 14 is disposed overhead and adjacent the inbound staging area 34, the outbound staging area 36, and the deposit and retrieval areas 38 and 40. In addition, details are shown of the storage container in the form of individual trays 72, each having receptacle trough areas 74 for the can end 56. A cross feed container conveyor generally designated 76 is provided for positioning individual storage trays 72 during loading and unloading. Additional details of the angled infeeder units 42, outfeeder units 44 and the cross feed tray conveyor/magazine assemblies 18-20 are set forth below.

Referring now to FIGS. 27-30, the principal components of the angled infeeder units 42 include a plurality of guiding rails or tubes forming the inbound lanes 46 for directing a plurality of inbound articles, in this case, can ends 56, which are in nested, face-to-face relation toward the balancer apparatus 10. Adjacent the innermost or downstream ends 78 of the guide units 36 are a plurality of so called integrated mover units 30, details of which are shown in FIGS. 27-29. The foregoing and other elements are mounted at an angle on an accelerator/separator machine frame generally designated 80.

Figures 7, 8:
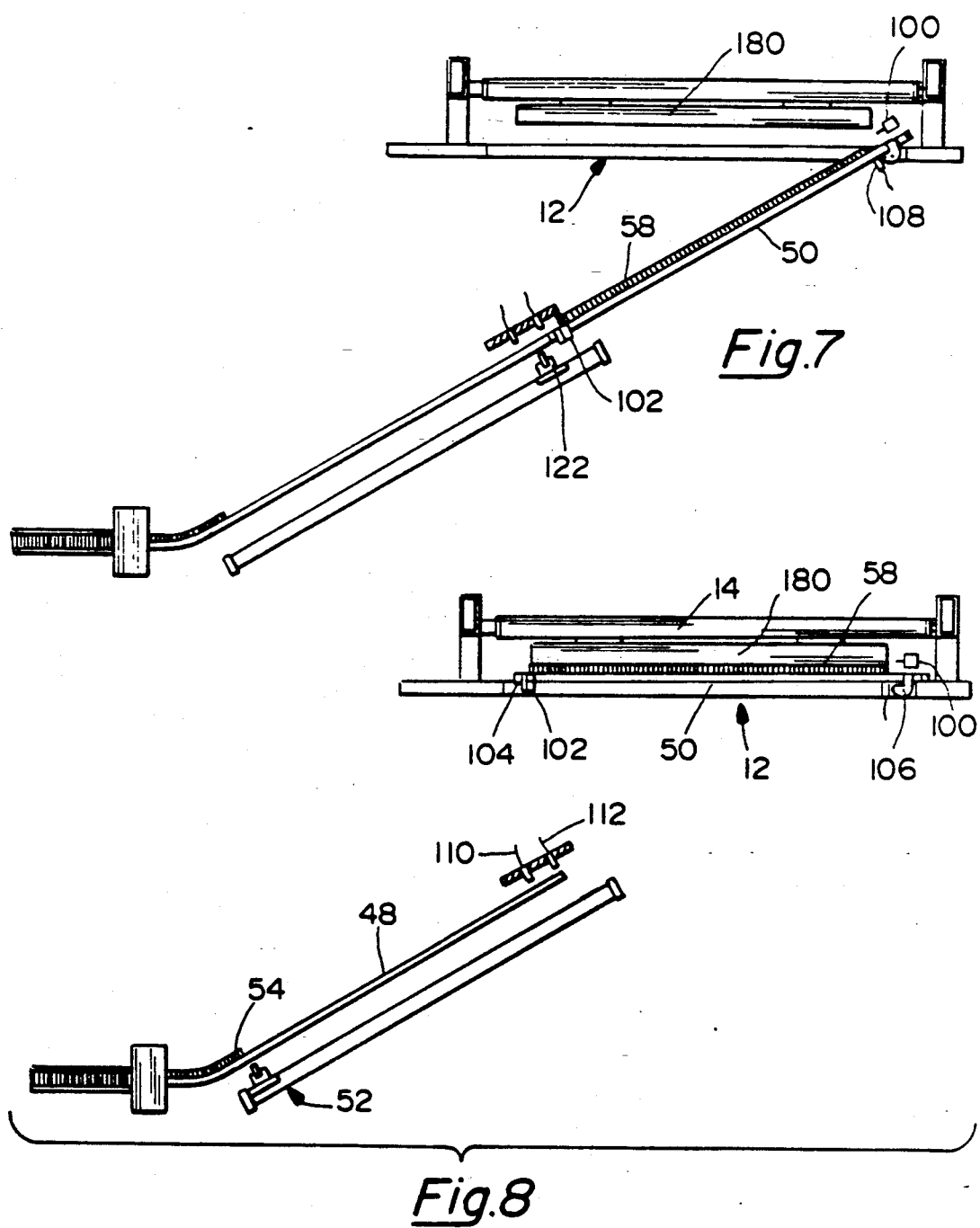
FIG. 7 is a side elevation view similar to FIGS. 4-6 showing the holder finger elements of the rotatable track segment in an extended holding position to positively hold the endmost can ends of the stack for further transfer.
FIG. 8 is a side elevation view similar to FIGS. 4-7 showing the separated and gripped stick ends rotated by the track segment up into the inbound staging area awaiting pick up by the transfer means.
Figure 9:
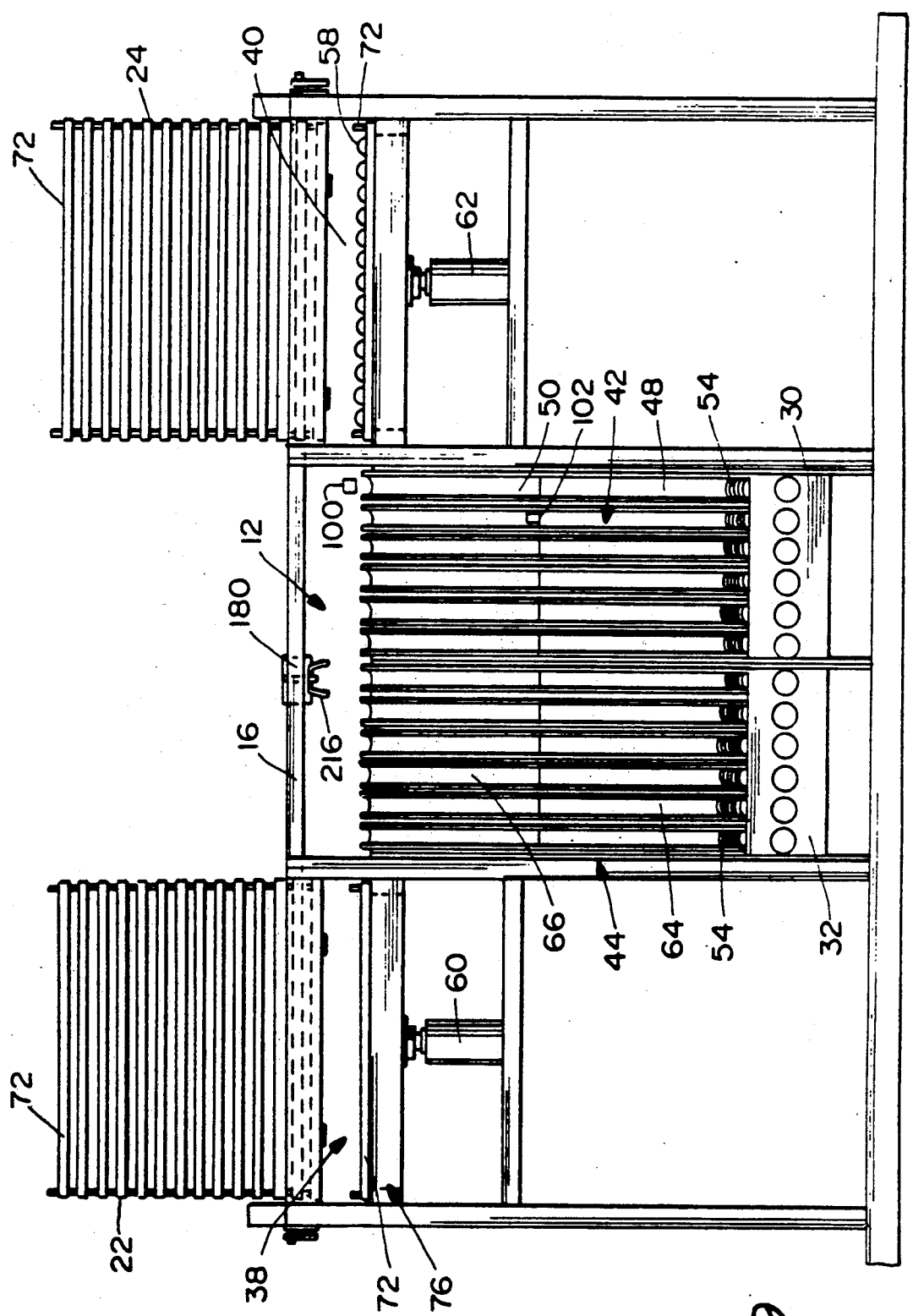
FIG. 9 is a front elevation view of the preferred balancer apparatus shown in FIGS. 1-2.

The accelerator/separator 52 includes a plurality of group or stick forming assemblies each generally designated 82, plural group transport assemblies, and plural transport actuator assemblies generally designated 86. Since the articles being fed are can ends 56, the inclined feeder tracks 48 and rotatable track segments 50 in the accelerator/ separator 52 are in the form of semi-circular channels 88 disposed parallel to one another. As shown in FIGS. 7-8, rotatable track segments 50 each include a forward stop 100 at one end thereof extending into the transfer station below the transfer mechanism 14. Reciprocatable step fingers 102 adapted to extend upward into the channel 88 adjacent a free end 104 of rotatable track segment 50 to hold the last of the can ends of a stick of ends 58 disposed in track segment 50. Rotator means 106 in the form of a piston/rod and cylinder assembly may provided to move the rotatable track segment 50 for an angled lower position to a raised horizontal position under the transfer head 14.

The rotatable segments 50 beneath the cross frame in their raised horizontal position may be referred to from a functional standpoint as inbound staging areas or lanes 34, and these areas are defined by fixed stop units 100 for the leading article 56 in the group 54 and movable stop fingers, generally designated 102, for the trailing article in the group 54. The fixed stop units 100 normally have associated therewith a detector 108, such as a light beam and photoelectric cell arrangement to indicate that a group 54 is in the channel 48. A stick length sensor 110 and an overload sensor 112 are provided at the upper end portion of inclined feeder tracks 48. As will appear, a measured stick length of articles may be advanced, supported and maintained in a group by being held between the fixed and movable stops 100 and 102.

FIG. 28 shows that each of the ends 56 has a countersink wall 114 which permits nesting of the ends as a whole. This wall 114 and the curl forming the top of the end are gripped by the working surfaces, thereby aligning the ends vertically. The ends nest relative to one another, and hence do not readily fall forward or backward from the group; therefore, assuming that they are kept relatively close together axially. Pushers for the groups of ends exert an axial compressive force on the group of ends.

Referring to FIGS. 27-30, the infeed mover assembly 30 and the accelerator/separator units 52 are shown.

Each of the stick forming accelerator/separator assemblies 52 includes a vertically reciprocable string divider blade 120 adapted to engage a leading edge of the ungrouped array 54 of ends 56 to transiently prevent advancement of the remainder of the string 54. This blade 120 and its associated elements cooperate with means in the form of an opposed pair of knife edges on accelerator jaws 122, 124, arranged on a scissor mechanism generally designated 126. When the stick length sensor 110 senses the leading end of a string in the inclined feeder track 48, the blade 120 moves vertically in response to a length signal, and thus begins the process of dividing the ungrouped array 54 into a leading and a trailing group. Immediately thereafter, the accelerator jaws 122 and 124 move inwardly to engage the trailing edge of the last article 56 in the group lying downstream of the blade 120. The immediately successive operations of the vertical blade 120 and the closable jaws 122, 124 ensures that the division between leading and trailing articles is made cleanly, and that both sides of a single article 56a are engaged, rather than sides of adjacently disposed articles, which might create tilting and misfeed.

Referring now to the scissor mechanism 126, this will be seen to include left and right hand bell crank arms 128, 130, which are mounted on pivot pins 132, 134. An air cylinder 136 positioned by a yoke 138 and containing an operating rod 140 is able to move a clevis pin 142 through a short vertical range of movement. This pin 142 is disposed in slots 144, in the inner margins of the crank arms 128, 130. Consequently, upon a signal generated by the stick length sensor 110, the pneumatic cylinder 136 may be actuated, and the jaws 122, 124 rapidly move radially inwardly and engage the trailing surfaces of the trailing article 56a to form an article group 58. As shown in FIG. 30, the yoke 138 is in turn positioned on a carrier element 146 forming a part of the accelerator transport mechanism 148 described herein.

Referring again to FIG. 30, will be noted that the upper "pre-splitter" or vertically reciprocating blade 120 is also operated by a pneumatic cylinder generally designated 150 and containing an operating rod 152 which terminates at its lower edge in a holder 154 for the blade 120.

Referring now in particular to FIG. 30, the operation of the accelerator transport actuator 148 will be described. In this connection, will be understood that the actuator 148 is only one of a group of substantially identical actuators used to operate various mechanisms of the invention. The actuators of the type presently preferred for use in the present invention are of a type known as "Tol-o-matic" cylinders which are made by the Tol-o-matic Company of Minneapolis, Minnesota and whose operation is known to those skilled in the art. The following general description therefore is made for ease of understanding and is primarily schematic.

Referring now to the lower part of FIG. 27., the actuator assembly 148 includes a housing generally designated 156, having an interior cylindrical side wall 158 which positions a reciprocating piston 160 having one end of a continuous metal tape 162 attached to each of its end faces. The tape 162 is trained over a rotary, fixed axis guide roller 164 positioned in an end cap 166 for the interior chamber 168 or cylinder 158.

The actuator 148 also includes a seal for retaining air within the interior cavity 168 of the cylinder 158. The other ends 172 of the tape 162 are affixed to either end of the carrier 146. The carrier 146 includes a cover unit 178 having guide ears 179 received in longitudinally extending guide slots 176 on the exterior of the unit 148. Consequently, in operation, when either end of the cylinder is pressurized, the piston 160 will move in the opposite direction, moving the tape 162 over the roller 164 and causing the carrier unit 146 to move atop the housing 178 in the opposite direction. A series of Commercial units normally include a series of protective covers or casings for the tape and appropriate keyways or like arrangements generally shown in FIGS. 27-30 are usually provided for this purpose.

Referring now to FIGS. 31 and 32, various construction and operational details of the transfer mechanism 14 and its pick-up head 180 of the invention are shown. The pick-up head 180 is of a generally known type, such as that referred to for example in U.S. Pat. No. 4,808,057. However, this head has been modified somewhat for the purpose of the present invention and is therefore shown in detail here.

The transfer head mechanism 14 includes the cross frame 181, which serves to mount a pick-up head generally designated 180. A motor (not shown) and its associated control and gear drive, actuate a toothed belt drive 248, which accurately indexes the pick-up head assembly 180 over a desired trough or lane in the staging areas or storage deposit and retrieval areas. Two longitudinal guide rods 16 have bushings 17 with eyes which align the pick-up head assembly 180 and position it for reciprocable movement in use. FIG. 31 shows additional construction and operational details of the pick-up head mechanism and related components.

Basically, the pick-up head assembly 180 includes a pick-up head frame 195, means for moving the head 180 transversely over the lanes at 34, 36 and at areas 38 and 40 which the sticks of articles 58 are received, and means for moving the head vertically, means for removing the ends or other articles once gripped, and means for securing the ends against falling from the end of the assembly unit 180.

FIG. 31 shows not only the pick-up head frame generally designated 195, but the arrangement of the movement and guide systems. Thus, the head 180 includes a mounting bracket 182 having an eye 184 therein for receiving mounting pin 186. The pin 196 is disposed in a lower portion of an operating rod 188 extending from the lower end of a piston and cylinder assembly generally designated 190. According to the invention, the double acting piston and cylinder assembly 190 causes vertical reciprocation of the bracket 182 and the head 180 carried thereby.

In order to insure appropriate vertical movement in an aligned relation, left and right hand identical guide rods 192, 194 are received in suitable bearings 196, 198 provided in the frame. The lower ends of the guide rods 192, 194 are pinned, as at 200, 202 to two stub mountings 204, 206 on the top frame 208 of the pick-up head 180.

Referring to FIG. 32, it will be noted that on the interior of the head assembly 180 there is disposed a longitudinally extending, inverted V-shaped channel unit 210, which is secured to an associated knock-out cylinder 212 at plural, spaced apart points by a rod 214. Actuation of the cylinder 212 moves the support rod 214 vertically, pushing the ends or other articles therein downwardly relative to the frame 208. As is shown in FIG. 32, articles such as the ends generally designated 56 are retained in place by the radially slightly inwardly directed lower margins 216, 218 of sidewalls 220, 222 of the pick-up head 180.

In the preferred form of unit, these sidewalls 220, 222 are made from a plastic material, such as a "Lexan" polycarbonate plastic material having a strong elastic memory. In use, the sidewalls 220, 222 deflect slightly outwardly when the head 180 is received over a fixed column or group of ends or other articles, and are thus simply press fit into the article receiving area 224 in the pick-up head 180.

The innate resiliency of the sidewalls 220, 222 is sufficient to confine the articles 56 until they are forcibly removed by actuation of the cylinder 212 and the rod 214. One cylinder piston and rod assembly 212, 214 is described in detail; its counterpart generally designated 226 in FIG. 31 will be understood to be identical and is therefore not described in detail herein.

Referring again to FIG. 31, there is shown a pair of substantially identical, left and right hand end clip assemblies 226, 228 respectively. Each of these is intended to position an apertured end plate 230 by means of an arm 232 to retain ends within the pick-up head 180. The end plate 230 preferably includes a semi-circular recess 234 permitting it to fit over the end of stop finger 100 on the rotatable infeed track segment 50 in its raised position in the transfer station 12.

FIG. 31 shows the left hand mechanism 226 in the open position, toward which position it is schematically shown to be biased by a spring 236. Upon generation of a proper signal, the control cylinder 238 is actuated pneumatically, urging the operating rod 240 vertically until it engages the lower surface of the pivot arm 232. Further movement causes the arm 232 and the end plate 230 to rotate about the axis of the pivot pin 242, thus positively retaining the ends 56 within the pick-up head 180. FIG. 32 also shows that clamps 244, 246 are used to secure the free ends of the drive belt 248 to the movable head 180.

Hence, it is apparent that in operation, when it is desired to position the upper frame such that the head 180 is aligned with a given lane 34, 36, 38 or 40, the control (not shown) is actuated and the drive motor (not shown) moves the belt 248, stopping the unit 180 just above the desired lane in the staging areas. A D.C. motor drive of a known type is suitable for this purpose.

Thereupon, the cylinder 190 is actuated and the head 180 is lowered fully until the ends are gripped between the sidewalls 220, 222 of the head 180. This is done with the end clamps 226, 228 in the open or extended position. The ends clamp cylinders 238 are then actuated to close the end clamps 226, 228 to manage the respective ends of the stick. The cylinder 190 is then actuated, raising the head 180. The motor pulls the belt 248 until the head 180 is positioned over a trough 74 or an outbound lane 36. Then, the sequence of operation is reversed.

When the head 180 is lowered by the cylinder 190 to place a stick in an appropriate lane or trough, the unloading or discharge cylinder 212 and rod 214 are energized to drop or eject the stick of ends from the pick-up head 180. Next, the pick-up head 180 is moved by the pick up head driver 248 to the next succeeding position over a lane or trough and the cycle is repeated.

As pointed out, the machine, using the stick length memory, and being appropriately programmed for an operating sequence as will be described, is able to determine the particular of lane from which an article groups is to be picked up, and also recalls the appropriate length for each group.

Although not shown in detail, it will be understood that a plurality of incoming arrays of ends 54 in lanes 46 may thus be subdivided into individual groups and handled as will appear; three to ten incoming lanes are presently preferred for use in the load regulator of the invention, although more may be provided.

Figure 10:
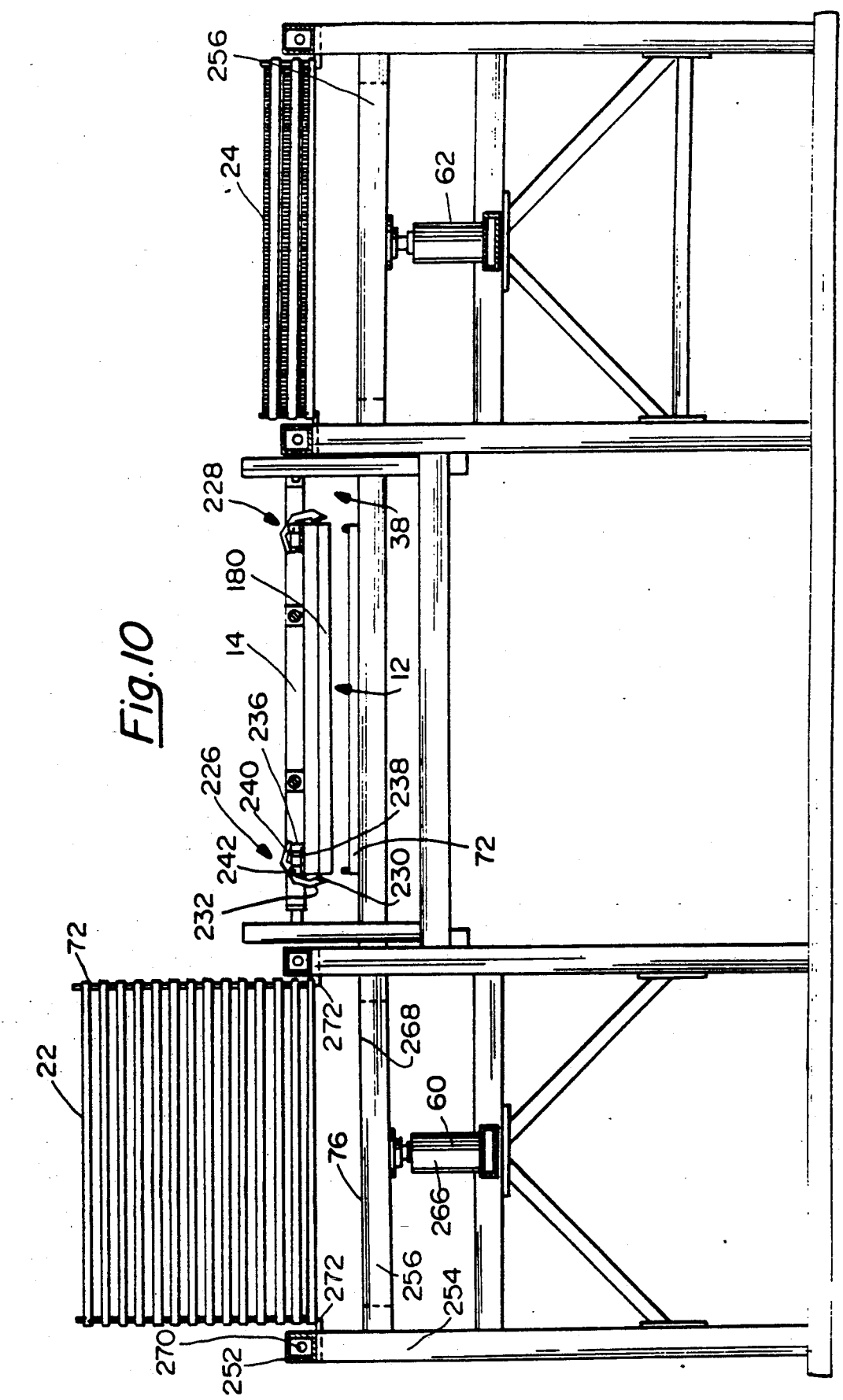
FIG. 10 is a side elevation view of the preferred balancer apparatus showing the tripping and releasing means of the transfer head as well as a preferred conveyor/magazine storage assembly in greater detail.
Figure 11:
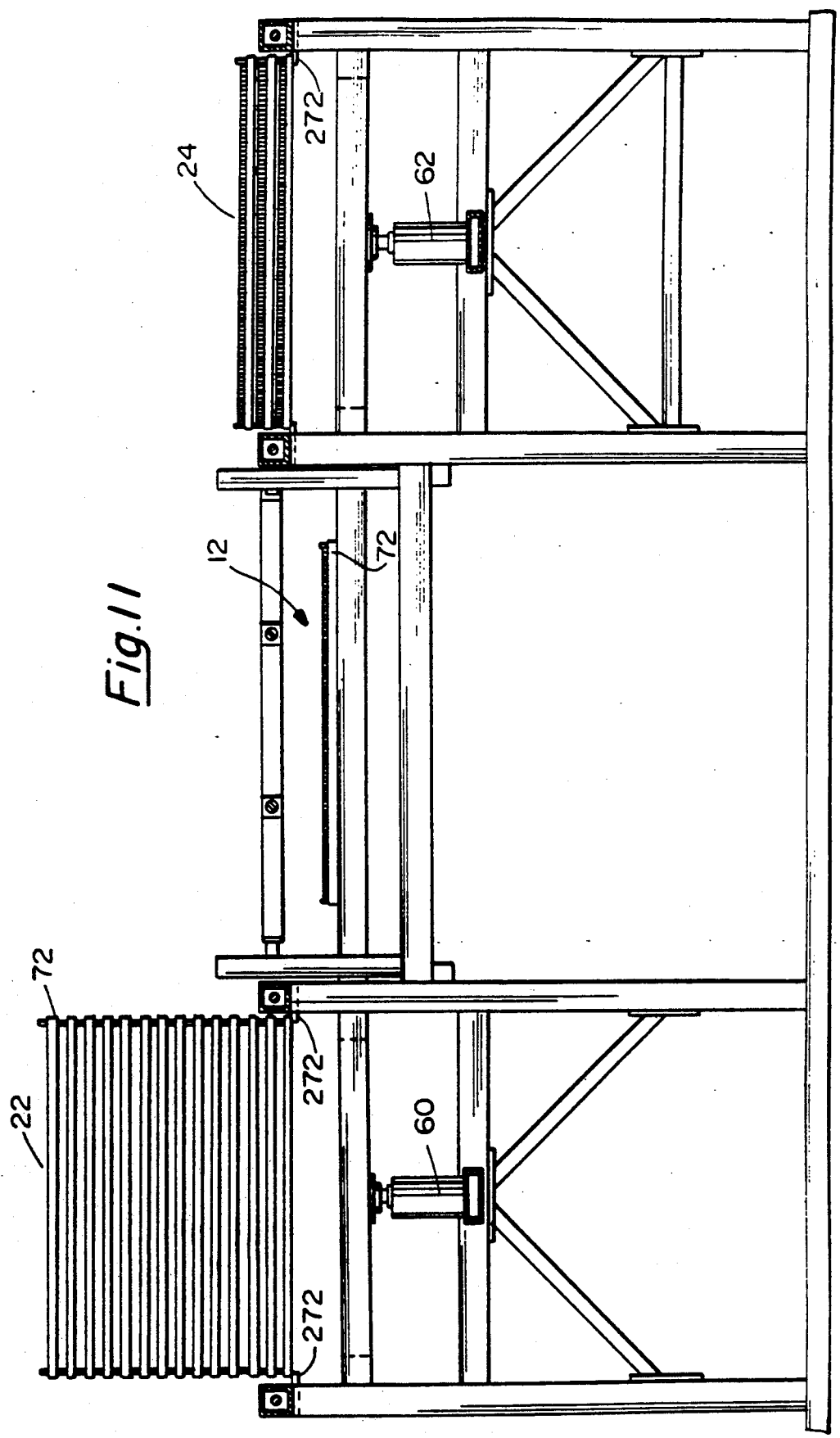
FIG. 11 is a side elevation view similar to FIG. 10 with portions of the transfer means omitted showing an empty storage tray deployed from the empty tray magazine onto the storage tray conveyor and a filled storage tray at the load/unload position at the transfer station awaiting rightward conveyor advance, as shown, to position the filled tray within the filled tray magazine area and the empty tray within the transfer station.

Referring now to FIGS. 1-2, 10 and 15-23, several other principal elements of the invention are shown, and the capability of the magazine assemblies 18 and 20 are shown. As shown in FIG. 10, each of the magazine assemblies 18 and 20 include cross feed conveyor 76 for serving to move empty and full trays or storage containers 72 to and from their respective empty and filled tray magazines 22, 24 and 26, 28.

Referring again to FIG. 10 and 35, and in particular to the storage magazines 22, 26 for empty and filled tray respectively, the empty tray magazine 22 is shown to include a magazine frame 252 having vertical frame members 254, horizontal members 256, and tray guides 258.

Frame members 254 includes one or more journals 260 for accommodating a continuous chain 262 having pusher fingers 264 thereon and forming a part of the cross feed tray conveyor 76.

In FIG. 35, an empty tray 72 is shown resting on the conveyor 76 just referred to.

Referring again to FIG. 10, each magazine 22, 24, 26, 28 has an associated tray lift 60 and 62. The lift unit 60 includes a piston and cylinder arrangement 266 operating a tray support frame 268 which engages a tray 72 when raised into a position of contact herewith. The piston and cylinder assembly 266 permits the support frame 268 to be raised at least to and slightly above the level of the drive shaft 270 of the tray support fingers 272.

FIG. 10 also shows that magazine 26 has a similar lift 62 having a piston and cylinder assembly 266 and a support frame 268 forming a part thereof. FIG. 10 shows that the full tray magazine assembly 26 is the same as that of its counterpart 22, except that the tray 72 has a plurality of stick ends 58, or other articles disposed therein. Magazine 26 has a journaling bearing for the end of the cross feed tray conveyor 76 extending therein. Reciprocable container support fingers 272 are operated by racks 274 which are in turn driven by the pinion gears 276 to provide for reciprocating movement of the support fingers 272 into and out of supporting relation with the lower surfaces of the tray 72, as the tray lift units are raised and lowered.

The tray conveyor chain 262 is moved by a drive sprocket 278 operated by an electric motor and gear drive 280. This chain type conveyor is conventional in all respects, and is driven intermittently between three distinct positions under the control of the conveyor drive mechanism 280 or otherwise as is known in the art. The cross feed conveyor movement serves to position the tray 72 so that it is disposed in the empty tray magazines, 22 or 24 in the storage deposit and retrieval areas 38 or 40 or the filled tray magazines 26 and 28 respectively.

In use of the apparatus 10, one tray 72 may be in the process of being removed from a stack of counterpart empty trays in empty tray magazine 22 and placed on the cross feed conveyor 76, as shown, while another, filled tray 72 is being added to the stack of full trays at the opposite end of conveyor in filled tray magazine 26.

The storage magazines add to and take from an overhead stack of storage trays in a manner shown by the sequence in FIGS. 15-23. More particularly, lift 62 is raised until the surfaces of its corner pieces 282 engage the lower surfaces on the corner pieces 284 of the tray 72 disposed above it. In this position, the lift 62 is prepared to support the weight of the entire stack of storage containers. Then, the tray support drive mechanism is actuated, the support fingers 272 are withdrawn horizontally and the entire stack is raised in increments equal to the height of the tray. The support finger drive mechanism is then operated in the reverse or extending mode, so that the support fingers 272 engage the bottom of the lowermost tray 64. Thereupon the lift 62 withdraws to a retracted position and the entire stack is supported until repetition of this cycle, or the reverse cycle. The trays are thus "upstacked" or "downstacked" as indicated.

Referring now to FIG. 35, certain details of the cross feed or tray conveyor 72 are shown. Here, a plurality of shafts 304, 306 are shown to carry drive sprockets 308, 310 over which are trained conveyor chains 262. The framing members support brackets on which a plurality of tray rests are secured. These tray rests engage the undersides of the trays and may be made from a block of solid, lubricous plastic material such as a polyethelene or TFE (tetrafluoroethylene) material permitting the tray to slide therealong with minimum friction. The trays are actually advanced by being engaged by the pusher fingers 264, which are in turn affixed to and spaced apart on the conveyor drive chain 262.

The intermittent bi-directional operation of the conveyor drive chain is also accomplished with the aid of proximity sensors or other suitable controls to provide precise indexing and alignment for the motor mechanism 176, 178.

Referring now to FIGS. 3 and 4-8, the operation of the preferred angled infeed subassembly 42 are shown. A similar angled outfeed or discharge unit 44 is shown in FIG. 3. More particularly and referring now to the sequence of operation depicted in FIGS. 4-8, in FIG. 4 a continuous string 54 of can ends 56 is fed along infeed lanes 46 extending from a high speed stamper apparatus. The continuous string of can ends is directed through infeed mover unit 30 and is urged along the upperwardly angled inclined feeder track 48 towards the transfer station. The angle of elevation for the inclined feeder track may be varied widely. Preferred angles can include 30 degree angle of elevation or 45 degree angle of elevation. The angle should provide a steep enough slope to prevent the leading can ends of a being formed stick from falling over forwardly during a transfer operation.

As shown in FIG. 4 as the leading end of an advancing continuous string 54 of can ends is urged upwardly along the inclined feeder track 48 towards a stick length sensor 110. In the starting position shown in FIG. 4, the rotatable upper track segment 66 of the inclined feeder track is in a lowered angle position with respect to the transfer head and transfer station so that it forms a smooth continuation of the inclined feeder track 48. The upper right-hand end of the rotatable track segment 50 includes a stick sensor 310 as well as the forward stop finger 100. A pivoting mounting is provided adjacent the transfer station. The rotatable track segment forms the inbound staging lanes 34 of the transfer station when they are rotated to their upward position. In the starting position shown in FIG. 4, the infeed accelerator jaws and splitter jaws are shown in their open condition at the left-hand portion of their "Tol-o-matic" cylinder tape.

Referring now to FIG. 5, as the leading edge of the continuous string of can ends is urged by the infeed mover along the inclined feeder track 48 until the leading most can end is sensed by the stickling sensor 110. Thereafter, the accelerator/ separator assembly is activated causing the splitter blade to be introduced into the string of articles to define a leading most group. The accelerator jaws close about the last can end in the stick being formed as shown in FIG. 5.

Referring now to FIG. 6, the "Tol-o-matic" cylinder has been activated and the accelerator jaws have been moved along the tape path to accelerate the group subdivided and formed towards the rotatable track segment located in the upper right-hand portion of the angled infeed track. The separator blade has again been retracted to permit the continuous string of can ends to resume its inward urging by means of the infeed mover shown at the lower left-hand portion of FIG. 6. In its fully extended rightward position as shown in FIG. 6 and 7, the separator/ accelerator jaws have moved the stick of string ends upwardly and rightwardly a distance sufficient to trigger the proximity sensor located in the upper right-hand pivot corner of rotatable track segment 50. In this fully extended position, the leading can end engages the fixed stop finger 100 disposed at the pivotable corner segment. Triggering the stick sensing proximity sensor causes the movable reciprocating holder finger 102 to be extended upwardly through an opening in the bottom of rotatable track number 2 positively engage the last can end being gripped by the accelerator/separator jaws in FIG. 6. Because the accelerator/ separator jaws engage the opposed sides of the can end, the reciprocating holder finger 102 may engage the last most can end between these jaws without interfering with the accelerator/ separator jaws return stroke operations. More particularly, in referring now to FIG. 7, the stop finger and reciprocating stop fingers have now been actuated as shown to positively hold the entire stick of can ends within the rotatable track segment. The accelerator/separator jaws are shown in their open position and the "Tol-o-matic" tape and cylinder for those jaws has been activated to permit the jaws to return to their original downhill position for recycling.

Referring now to FIG. 8, a means for causing rotation of the rotatable track segment has been activated to raise the held stick of can ends upwardly to assume a horizontal position under the transfer head in the transfer station. These operations occur while the continuous string of can ends progresses upwardly towards the stick length sensor. If the progressing string of can ends passes the stick length sensor and hits a maximum over-flow sensor 112 a signal will be generated to stop the infeed mover 30 to prevent additional travel of the continuous string along the angled inclined feeder track. As will be appreciated, as soon as the pick-up head of the transfer mechanism 14 has gripped and removed the stick of can ends from the inbound staging lane shown in position within the transfer station in FIG. 8, sensors immediately create a signal causing the rotatable track segment to be rotated downwardly into its angled infeed position awaiting the next successive group to be accelerated toward the transfer station. The cycle is repeated frequently during operation of the infeed and balancing operation.

Figure 12:
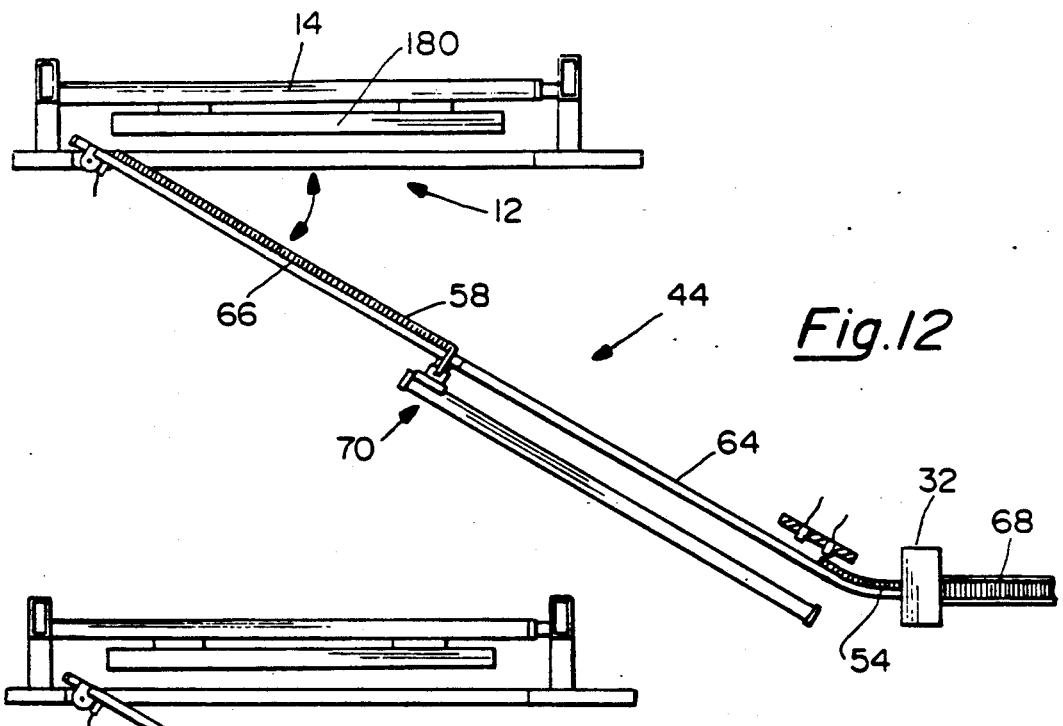
FIG. 12 is a side elevation view of the preferred outbound discharge assembly for use in the new and improved balancer apparatus showing a rotatable track segment comprising a part of the outbound staging area lanes in a lowered position with the discharge guide jaws shown closed against the leading can end of the stack with the discharge guide jaws upper position.
Figure 13:
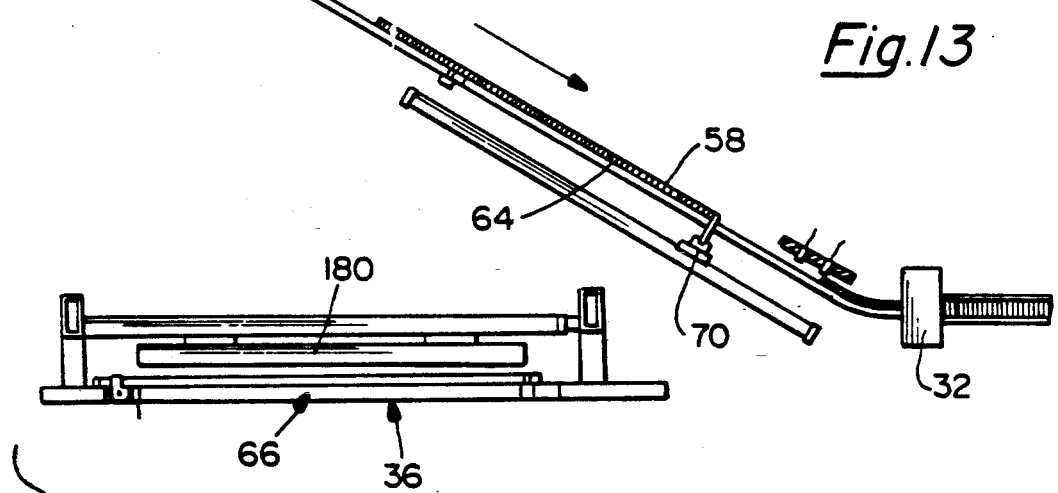
FIG. 13 is a side elevation view of the preferred outbound discharge showing the discharge guide jaws advancing the stick of can ends along the outbound lane to catch up to the last end of a previous stack of ends leaving the balancer apparatus.
Figure 14:
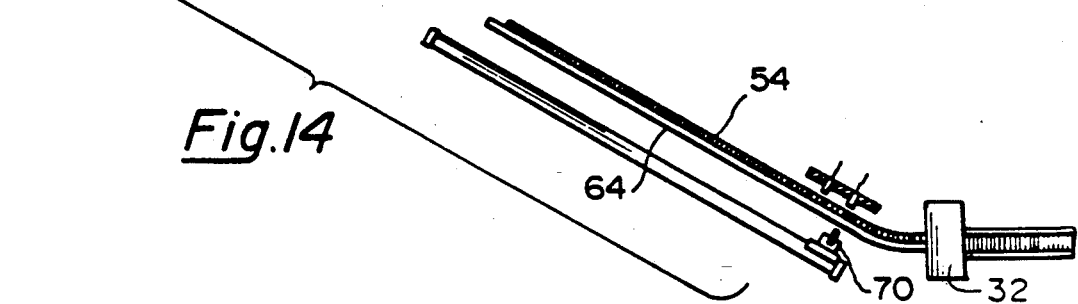
FIG. 14 is a side elevation view similar to FIG. 13 showing the discharge guide jaws in their lowermost and opened condition so that the stick of ends is guided in the outbound lane under the influence of gravity until it slants against the last end of a previously discharged stick of ends to reform a continuous outbound string of articles being advanced to a downstream work station and showing the rotatable track segment of the outbound staging lane in its raised position awaiting deposit of another stick of ends from the transfer head.
Figure 23:
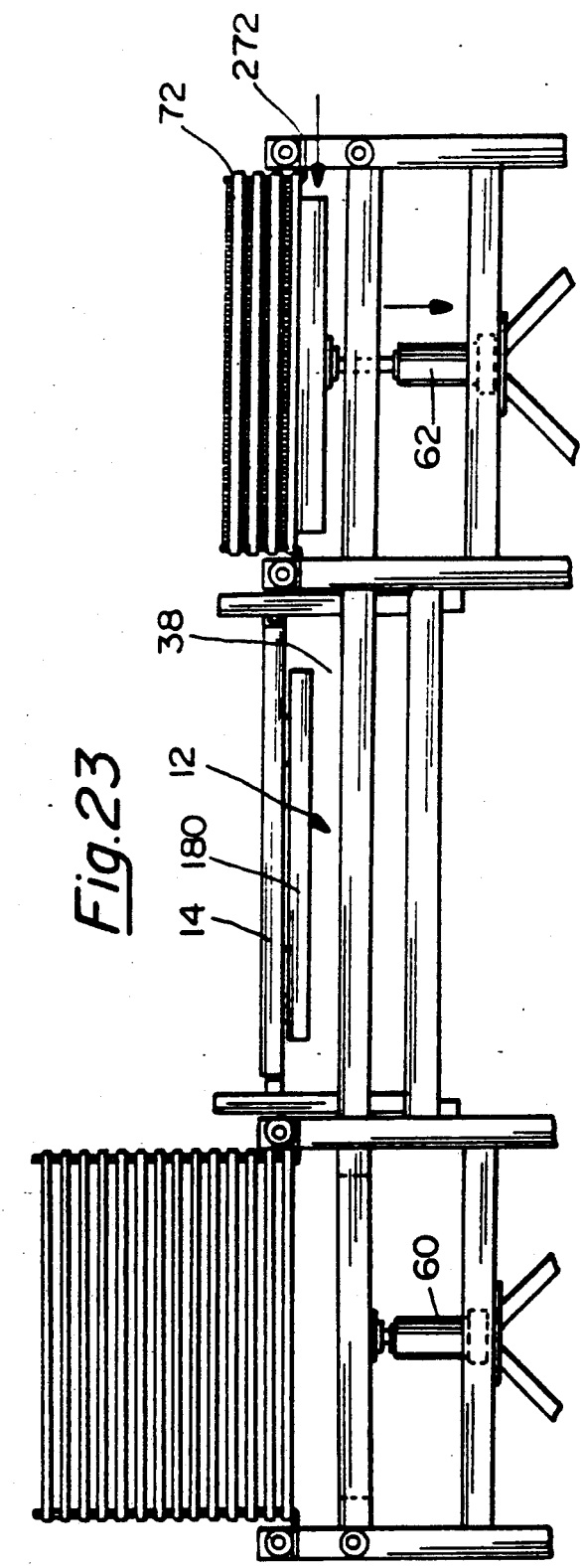

Referring now to FIGS. 12–14, the sequential operation of the angled outfeed unit 44 is shown. Outfeed unit includes an elongate outfeeder track 64 having a rotatable upper track segment 66 at one end and connecting to outbound lane 68 for carrying re-strung can ends upward to a downstream work station.

Once the pick-up head has deposited a stick of can ends into an outbound staging lane for consolidation and transport downstream, sensors initiate the contacting of the last-most can end by a reciprocating holder finger actuated by a piston and cylinder assembly and the outfeed guide jaws 70 are actuated to a closed position. The rotatable upper track 66 of the outfeed track 64 is in its horizontal position with respect to the transfer station. Thereafter, very quickly the rotatable driver means permits the upper rotating track segment 66 to rotate to the downward position shown in solid lines in FIG. 12. In this position, the entire stick of can ends is held under the influence of gravity against the closed outfeeder guide jaws which are similar to the accelerator/separator jaws shown in FIGS. 27-30. In the downwardly angled or inclined position, rightward movement of the outfeeder guide jaws 70 slowly permits the stick of can ends in its grasp to be lowered towards the previous end of can ends recently deposited. As shown in FIGS. 12 and 13, a pair of sensors are provided adjacent the outfeed consolidated unit including a previous string end positioning sensor and an under flow sensor. As soon as the last-most can end of a previously deposited stick is sensed by the string end sensor, the upper end of the angled outfeed unit is cleared to permit the next stick of can ends to be slid down the inclined outfeeder lanes and released to permit the stick of can ends to add on to the last-most can end of the previously deposited stick. The consolidated unit and the outfeeder guide jaw mechanism together form a reconsolidated unit for causing the individual sticks of can ends to be reformed into continuous strings of can ends for further transport and handling to downstream workstations. A stick end position sensor is provided at the lower right hand portion as shown of the rotatable upper track segment 66 which is effective to sense when the stick end has been slid beyond the free end of the rotatable track segment. This generates a signal causing the rotatable track segment to move to its upwardly disposed position shown in FIG. 14 to await placement of a subsequent stick of ends by the transfer head.

In accordance with this invention, the rotatable track segments 50 and 66 may be rotatably pivotably mounted at one end to a pivot pin mounting means and may be caused to rotate between their horizontal and angled extreme positions under the influence of a piston/rod and cylinder arrangement or the rotatable track segments may be fixedly mounted to a rotatable shaft as will be readily apparent to those skilled in this art.

Figure 24:
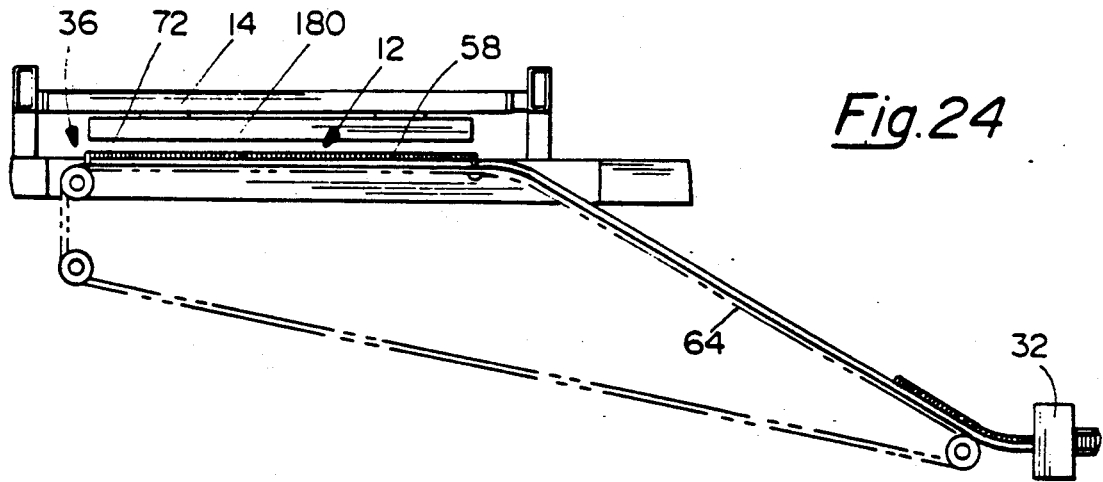
FIGS. 24-26 are side elevation views showing an alternate guided discharge assembly for use in the new and improved balancer apparatus of the invention.
Figure 25:
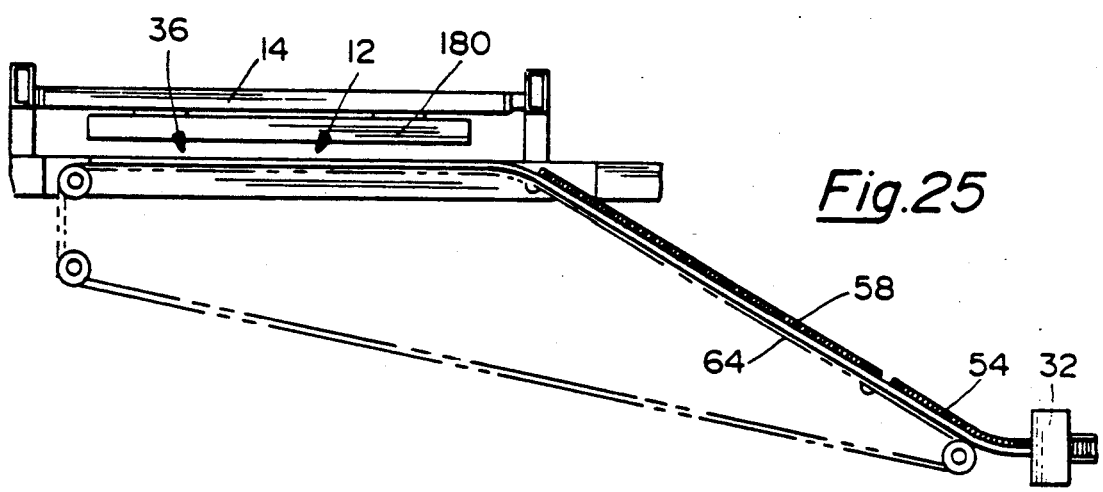
Figure 26:
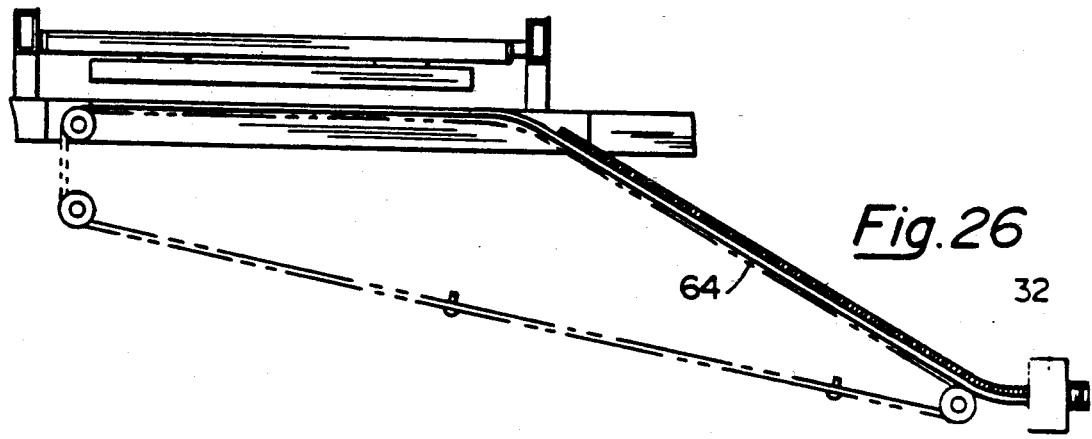

An alternate discharge arrangement is depicted in FIGS. 24-36. In accordance with this arrangement, angled discharge lanes are provided having a split center section capable of receiving a pair of upwardly projecting dogs or jaws mounted to a drive chain. Cam rails for opening the jaws are positioned at the lower right hand portion of the angled infeed track at a point located above the string end positioned sensor. Return cam rails for closing the jaws opening during the downhill travel are provided at the upper right-hand portion of the chain path of travel to reclose the jaws as they are positioned in the outbound staging lanes preparatory to receiving the next stick of ends from the pick-up head. In the operational sequence depicted in FIGS. 24-26, the outbound discharge chain conveyor and jaw system is disposed in a horizontal position with respect to the transfer station. The can end engaging jaws are connected together for conserted opening and closing movements and are shown in their closed position engaging the opposing ends of an elongate string of ends which have been deposited by the transfer head. Sensors sensing the end-most can end in the angled outfeeder lane 64 sends a signal to the conveyor drift shaft which may be a chain sprocket drive mechanism well known to those skilled in the art to begin its cycle rightward and downward along the chain path to manage the ends front and back during its downward travel. As the gripped stick of ends approaches the last end of the previously deposited stick, the front jaws engage cam rails which effectively open the jaws front and back and permit the stick of can ends to slide a very short distance until the first can end engages of the being discharged stick engages the last can end of the exiting string.

Assuming now that it is desired to place the load regulator apparatus 10 in operation, it will be assumed that all trays 72 are empty and that it is desired to begin operation. At this point, the presses furnishing the supply of can ends are started, and as ends move down their respectively associated plural conveyors and into the mover area where they are received in the individual incoming lanes. At start-up, perhaps only one shell press might be operated initially. Inasmuch as it is assumed that all trays are empty and that there are no ends in storage, all incoming ends are advanced uphill to the inbound staging areas one stick per lane at a time. The transfer head transfers the sticks positioned in the transfer station staging areas 34 one stick at a time to any empty trough of a tray in the storage deposit and retrieval areas 38 and 40. Accordingly, the appropriate signal having indicated that no transfer is to be made to the outbound lanes, an empty tray is removed from the empty tray magazine by cycling the tray feed so as to remove a single tray 72 from the tray support in the empty tray magazine 22 and place it on the cross feed conveyor 76. The tray is thereon indexed to the station 38 within the transfer station 12.

Thereafter, as each succeeding array of ends is subdivided, placed in the inbound staging area and picked up, it is transferred at the provided station 38 into any next open trough or channel 74 in the being-filled tray 72. Once filled, the tray is advanced to filled tray magazine and lifted to form a stack of filled trays as shown in the sequence of FIGS. 15-23. Under this assumption, the cycling just described would continue until a desired number of trays, say four or five, would be filled with ends. Up to this point the apparatus has functioned as a tray loader apparatus.

Thereupon, it is assumed, the downline or downstream machine or workstation would be prepared for operation and the apparatus 10 would receive a command to fill the outbound staging lanes 36 and the consolidation areas 32 and so a to continuously feed can ends in a string along lanes 68 to the downline apparatus. In this sequence, it is assumed that the supply ends received from the shell press is continuing. Since there is now a demand in the outbound staging area for a supply of ends, the previously subdivided sticks of ends are taken from the inbound staging area 34 and transferred directly to the outbound staging area 36, being fed respectively to each of the outbound track segments 66 in the outbound staging area as called for the downstream machines.

This cycling would continue, with all transfers of article groups or sticks being achieved continually. Assuming for the moment that the input or supply rate exactly equalled the demand rate, direct transfer by the pick-up head between staging areas 34 and 36 would continue. Assuming for the moment, however, that the demand in the downstream work stations exceeds the instantaneous supply, as would be indicated by a downstream signal sent directly, or by the presence of open areas in the tracks in the consolidation areas, e.g. by under supply sensor at the outfeed track 64 adjacent consolidator 32. In addition to the sticks of ends being transferred from the inbound staging area to the outbound staging area, the transfer apparatus 121 would periodically pick up sticks of ends 58 from a channel 74 in a tray 72 in the transfer and deposit areas 38 and/or 40. These sticks would be deposited in the appropriate outbound lane 66 in the outbound staging area 36, to supplement the directly supplied ends. This transfer from storage to the outbound staging area would occur as indicated by the demand on the downstream side. In five or ten direct transfer cycles, or otherwise as often as is indicated.

Assuming that the supply of incoming ends were to cease altogether, then the entire outbound staging areas would be supplied with ends taken from storage, and the machine would cycle repeatedly in this mode only. Thus, where there is a deficit in the supply, the demand is filled by direct transfer plus transfer supplementary ends from storage, with the possibility being that anywhere between some and all of the ends could be supplied from storage. If supply is completely halted, and all ends are placed from storage, the apparatus 10 is functioning as a tray unloader device.

Assuming for the moment, that the supply were in excess of the demand, ends would be placed in storage as indicated; in such instance, every fifth, tenth, twentieth stick could be placed in storage, for example. Of course, upon initial start up, or if the demand became zero as a result of line stoppage for maintenance, access, or the like, then all inbound ends would be placed in storage on a group-by-group basis, as previously indicated.

Accordingly, it will be seen that any amount, including the entire inbound amount of articles could be placed in storage; any outbound amount, including all the outbound articles, could be taken from storage, and any proportion of the outbound articles could be supplied from direct transfer to or from storage, depending upon conditions. The conditions are instantaneously reversible, with the machine operating on a group-bygroup basis. In other words, if there were a temporary excess of inbound ends, they could be placed in storage and even removed from the same placement into storage on the same or next following cycle. Thus, the response time of the machine is substantially zero.

Referring again to FIG. 36, a schematic representation of the above-described form of machine operation is shown. Here, operations which are optional or intermittently performed are shown in broken lines, while preferred or necessary operations are shown in solid blocks.

Thus, block 400 indicates that a supply of ends is being provided from an upstream machine such as a press, and shows that these ends may be accumulated as shown in block 402. A preferred but technically optional step is shown in block 404, namely, subdividing the strings of ends which have accumulated into groups for batch handling. Block 406 shows inbound staging of ends, i.e., preparing the ends for transfer as indicated in block 408. The transfer may be a direct transfer to outbound staging as shown at line 410, whereby the ends accumulate transiently in the outbound staging area 412. From here the ends may be optionally advanced to a consolidator 414 from which they are fed to a downstream machine having a given demand as represented by block 416.

According to the invention, regulation or control is accomplished in one aspect by decreasing the instantaneous rate at which the net supply of ends is sent to the outbound staging area, and in another aspect by increasing the instantaneous supply rate to the outbound staging area. Line 418 shows that the net supply of ends reaching the outbound staging area is decreased by transient storage of certain of certain groups of ends. Here, a single container schematically designated 420 provides transient storage or retrieval by group. An increase in the net supply rate to outbound staging is accomplished as shown at 422, namely, by retrieving groups of ends from the transient storage area 420 and using these groups to supplement the groups of ends being furnished directly from inbound to outbound staging areas from time to time. Block 423 and flow lines 424 and 426 show, respectively, storage or retrieval by container, i.e., adding ends to storage or retrieving ends from storage in full trays, i.e., upstacking or downstacking full trays. Step 426 shows upstacking or downstacking empty trays to add to or withdraw from the reverse tray or storage container capacity of the apparatus.

Control unit 428 is shown as detecting excess supply, block 430, thereby enabling or activating the condition shown at line 418, to decrease the net supply of article to output; where the demand is in excess of the supply as shown at 432, the condition in line 422 is enabled or activated, and the supply is supplemented.

The most essential steps are, therefore, inbound and outbound staging, transfer and storage, and retrieval by group under the control of the condition detector. Storage by container adds flexibility, while the accumulation and subdivision of ends, as well as consolidating ends may be considered optional in the sense that the machine need not itself include these elements to incorporate the invention.

Referring now to certain individual features, the machine logic is of a kind known to those skilled in the art, with various disabling and enabling controls being provided as indicated. Thus, in order for a pick up to be made from an inbound staging area, the lane must be entirely filled as indicated by an appropriate trailing edge sensor which would require a positive-going signal from a leading edge sensor, for example. The transfer to and taking from storage involves a complete stick and inasmuch as the ends or other articles are loaded into the tray in individual sticks, there is no need for gauging the stick lengths during each cycle.

Referring now to movement of the head portion of the transfer apparatus, the cycle time of this apparatus must be at least as many times faster than the fill-up time of individual infeed areas as there are separate infeed lanes. Thus, if there are four infeed lanes, each requiring twenty seconds to be filled, the machine should be able to engage, remove, and deposit a stick in less than five seconds, so that the maximum input capacity of the apparatus could be accommodated. By the same token, the number of transfer cycles able to be achieved by the head is the limiting factor of supply rate to the outbound lanes. The proximity or position sensors referred to may be of the photoelectric, magnetic, or other known type including those operating on infrared or visible light, utilizing the "Hall" effect, or otherwise as known to those skilled in the art.

A detailed description of the invention has been given, with regard to an embodiment wherein a single transfer head is used; it will be understood that two or more such transfer heads may be used if desired. The articles being manufactured are identified as can ends, but it will be appreciated that any kind of arrayable, mass produced articles which are subject to transfer between work stations, including assembly stations, are adapted for handling by the apparatus of the invention. These include metal and plastic parts of all kinds. The principles of the invention are applicable to balancing or regulating any type of work loads.

The invention is not limited to chain type conveyors, since hydraulic or other positioners may be used. A tray magazine with a vertical feed has been shown, but inverting or folding type stackers may be used, and containers other than trays may be used. Similarly, the storage capacity might be accommodated on, or form an integral part of, a conveyor or a single reciprocable container. Other mechanical variations of the apparatus will suggest themselves to those skilled in the art of industrial process machinery. Sensing and leveling mechanisms and detectors may be of any known kind, and the program sequence may be as indicated by the designer.

The apparatus may also be integrated with apparatus intended to add additional components to the line, if desired. In other words, more than one style of article may be handled in the machine, and articles may be pre-arrayed or assembled into groups or subgroups before being handled as a subdivided group by the apparatus. The unit may be constructed so as to include the infeed and outfeed conveyors or merely so as to be able to be interfaced with them. The method of the invention may be carried out by other types of apparatus as well.

Each of the above-mentioned commonly assigned patents and patent applications are specifically incorporated herein by reference.

Although the present invention has been described with reference to a preferred embodiment, modifications or changes may be made therein by those skilled in this are without departing from the scope and spirit of the present invention as defined by the appended claims.

We claim:

1. An apparatus for regulating the flow rate of an apparatus for articles moving between an upstream work station serving as a source of supply for such articles, and a downstream station having a demand for such articles, said apparatus having means for transiently accumulating inbound articles being fed in a continuous array, means for subdividing said continuous array of articles into individual groups, means for accumulating groups of articles intended to be fed downstream and means for advancing and consolidating said groups into at least one continuous array of articles destined for said downstream work station, article group transfer means adapted to engage and transport said individual inbound groups of articles to said area in which said articles are to be accumulated for advancement downstream, means for transferring selected groups of articles from said inbound accumulating area to a storage area in a storage container means and for removing groups of articles from a storage area in said storage container means and transferring them to said area in which said downstream bound articles are accumulating, at least one storage container means and means for positioning said storage container means within the operating range of said transfer means to a position generally coplanar with said inbound accumulator means and said outbound accumulator means and in laterally outwardly spaced adjacent relation to said inbound accumulator means or said outbound accumulator means or both, said storage container means including a plurality of elongate article group receptacle areas, and control means adapted to move said article group transfer means so as to supplement the number of groups of articles being fed to said downstream station by adding groups of articles taken from said storage container means to said groups being transferred from said area in which said inbound articles are accumulating, and for diminishing the supply of articles fed to said area in which said downstream bound articles are accumulating by transferring groups of articles from said area at which said inbound articles are accumulating to said storage area within said storage container means, said individual groups each having a generally linear configuration and each of said inbound accumulator means, said outbound accumulator means, said transfer means and said article group receptacle areas having a length dimension, extending parallel to each other and generally perpendicularly with respect to a longitudinal axis of said apparatus defining a transfer axis and a path of travel for said article group transfer means.

2. An apparatus as defined in claim 1, wherein said means for transiently accumulating inbound articles includes a plurality of elongate, parallel spaced-apart guide channels configured to closely, slidably receive a continuous incoming stream of articles, each guide channel being disposed at an angled orientation with respect to a support floor upon which the apparatus rests, each guide channel including an article receiving end and an opposed article staging end positioned adjacent an article group transfer station, each said article staging end including a fixed stop means and a movable stop means mounted to said guide channel at a point spaced from the fixed stop means and intermediate the fixed stop means and the article receiving end, each said movable stop means including finger means movable between a stop position wherein the finger extends into the guide channel and a retracted position wherein the finger is withdrawn from the guide channel each said guide channel further including a rotatable track segment at said staging end and including said fixed stop means and said movable stop means, said rotatable track segment being movable from its original angled orientation to a second orientation parallel to said support floor thereby positioning the inbound accumulator means in a transfer position along the transfer axis and whereby opposing ends of each article group are held by said fixed and said movable stop means during rotation and pickup by said transfer means to provide enhanced article group management preparatory to transfer.

* * * * *